(12) United States Patent
Lin et al.

(10) Patent No.: US 10,298,418 B2
(45) Date of Patent: May 21, 2019

(54) SYSTEM AND METHOD FOR DISINTEGRATED CHANNEL ESTIMATION IN WIRELESS NETWORKS

(71) Applicant: The Trustees of Princeton University, Princeton, NJ (US)

(72) Inventors: Jia-Chin Lin, Taoyuan (TW); Harold Vincent Poor, Princeton, NJ (US); Kao-Peng Chou, Taoyuan (TW)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 15/404,687

(22) Filed: Jan. 12, 2017

(65) Prior Publication Data

US 2017/0201394 A1    Jul. 13, 2017

Related U.S. Application Data

(60) Provisional application No. 62/277,704, filed on Jan. 12, 2016.

(51) Int. Cl.
*H04L 5/00* (2006.01)
*H04B 7/155* (2006.01)
*H04L 25/02* (2006.01)

(52) U.S. Cl.
CPC ..... *H04L 25/0224* (2013.01); *H04B 7/15507* (2013.01); *H04L 5/0048* (2013.01)

(58) Field of Classification Search
CPC ................ H04B 10/29; H04B 10/2937; H04B 2210/256; H04B 3/36; H04B 3/58; H04B 7/14; H04B 7/15; H04B 7/155; H04B 7/145; H04J 1/10; H04L 12/60; H04L 13/12; H04L 2001/0097; H04L 25/20; H04L 25/24; H04L 25/44
See application file for complete search history.

(56) References Cited

U.S. PATENT DOCUMENTS

| 4,134,069 A * | 1/1979 | Shiki ................. H04B 7/15564 455/16 |
| 6,757,265 B1 * | 6/2004 | Sebastian ............. H04B 7/0613 370/319 |

(Continued)

OTHER PUBLICATIONS

Gao, et al., "Superimposed Training Based Channel Estimation for OFDM Modulated Amplify-and-Forward Relay Networks," IEEE Transactions on Communications, vol. 59, No. 7, Jul. 2011 (11 pages).

(Continued)

*Primary Examiner* — Sharad Rampuria
(74) *Attorney, Agent, or Firm* — McCarter & English, LLP

(57) ABSTRACT

A system and method for disintegrated channel estimation in wireless networks. The system provides a disintegrated channel estimation technique required to accomplish the spatial diversity supported by cooperative relays. The system includes a filter-and-forward (FF) relaying method with superimposed training sequences for separately estimating the backhaul and the access channels. To reduce inter-relay interference, a generalized filtering technique is provided which multiplexes the superimposed training sequences from different relays to the destination by time-division multiplexing (TDM), frequency-division multiplexing (FDM) and code-division multiplexing (CDM) methods.

14 Claims, 13 Drawing Sheets

(56) References Cited

U.S. PATENT DOCUMENTS

| | | | | |
|---|---|---|---|---|
| 9,769,871 B2* | 9/2017 | Giloh | ................ | H04L 45/54 |
| 2009/0092072 A1* | 4/2009 | Imamura | ............ | H04B 7/15542 |
| | | | | 370/315 |
| 2010/0254300 A1* | 10/2010 | Gulasekaran | .......... | H04B 7/155 |
| | | | | 370/315 |
| 2017/0235316 A1* | 8/2017 | Shattil | ................... | G05D 1/104 |
| | | | | 701/3 |
| 2018/0287834 A1* | 10/2018 | Wesemann | ............ | H04L 25/497 |

OTHER PUBLICATIONS

Lalos, et al., "Frequency Domain Channel Estimation for Cooperative Communication Networks," IEEE Transactions on Signal Processing, vol. 58, No. 6, Jun. 2010 (6 pages).

Chou, et al., "Disintegrated Channel Estimation in Scalable Filter-and-Forward Relay Network with IRI Coordination," Wireless Telecommunications Symposium (WTS) (2015) (6 pages).

* cited by examiner

SYSTEM AND METHOD FOR DISINTEGRATED CHANNEL ESTIMATION IN WIRELESS NETWORKS

RELATED APPLICATIONS

This application claims priority to U.S. Provisional Patent Application No. 62/277,704 filed on Jan. 12, 2016, the entire disclosure of the application hereby expressly incorporated by reference.

STATEMENT OF GOVERNMENT INTERESTS

This invention was made with government support under Grant No. CNS-1456793 and Grant No. ECCS-1343210 awarded by the National Science Foundation. The government has certain rights in the invention.

BACKGROUND OF THE INVENTION

Field of the Invention

The present disclosure relates to channel estimation in wireless networks. More specifically, the present disclosure relates to a system and method for disintegrated channel estimation in wireless networks.

Related Art

In the field of wireless telecommunications, providing communications channels that are reliable and of high quality of service are paramount concerns. Cooperative communication has become one of the most essential aspects of recent mobile communication. A relay network represents one form of cooperative communication and has attracted a large amount of research in recent years. A space-time coding technique supported by relays has, in the past, been employed to achieve spatial diversity. The achievable diversity obtained using cooperative networks was studied previously. It has been found that the relay nodes alter the received signals according to the space-time block code (STBC) arrangement and then send the resultant signals to the destination node. The diversity achieved using the distributed STBC (D-STBC) with relays can be achieved by accurately estimating multiple timing errors and multiple frequency offsets as well as acquiring precise knowledge of the channel state information (CSI). Additionally, previous studies have successfully addressed the problems caused by timing errors and frequency offsets.

To acquire accurate knowledge of CSI, several channel estimation techniques have been investigated previously. These techniques are often categorized as (1) cascaded channel estimation; and (2) disintegrated channel estimation. However, cascaded channel estimation is ineffective for several applications such as optimal relay matrix design and beamforming. In existing relay beamforming techniques, relay gains were adjusted to suppress interference. Concerning disintegrated channel estimation, two methods are usually adopted to obtain disintegrated CSI at the destination node. In the first method, the source-relay channels are estimated at the relay nodes first by means of a conventional single-hop channel estimation, and the estimates are then quantized, compressed and sent toward the destination node via dedicated channels. Thus, the relay nodes are required to conduct source-relay channel estimation and compression with high complexity, and additional time slots or subchannels are required to deliver the source-relay estimates, decreasing both the spectral and energy efficiencies. In the second method, both the source-relay and the relay-destination channels are estimated at the destination node. A method utilizing relay pilots to conduct disintegrated channel estimation was studied previously, in which several pilot subcarriers are preserved for sending the relay pilots. It was found that the destination node can estimate the source-relay-destination and the relay-destination channels by exploiting the source and the relay pilots, respectively. The orthogonality requirement of the relay pilots was addressed in a previous study. In addition, the orthogonality was exploited to generate training sequences that can be applied in an amplify-and-forward (AF) relay network. Because prior efforts only studied a disintegrated channel estimation in a single-relay network, generalizations and improvements of the disintegrated channel estimation techniques in multiple cooperative relay network are strongly desired.

Accordingly, what would be desirable is a system and method for disintegrated channel estimation in wireless networks, which addresses the foregoing shortcoming of existing systems.

SUMMARY OF THE INVENTION

The present disclosure relates to a system and method for disintegrated channel estimation in wireless networks. The system provides a disintegrated channel estimation technique required to accomplish the spatial diversity supported by cooperative relays. The system includes a filter-and-forward (FF) relaying method with superimposed training sequences for separately estimating the backhaul and the access channels. To reduce inter-relay interference, a generalized filtering technique is provided. Unlike the interference suppression method commonly used in conventional FF relay networks, the generalized filtering matrix provided herein multiplexes the superimposed training sequences from different relays to the destination by time-division multiplexing (TDM), frequency-division multiplexing (FDM) and code-division multiplexing (CDM) methods. The Bayesian Cramér-Rao lower bounds (BCRBs) are derived as the estimation performance benchmark. The mean square errors (MSEs) of the disintegrated channel estimation are also derived. Finally, the improvements offered by the present system are verified by comprehensive computer simulations in conjunction with calculations of the BCRBs and the MSEs.

BRIEF DESCRIPTION OF THE DRAWINGS

The foregoing features of the invention will be apparent from the following Detailed Description, taken in connection with the accompanying drawings, in which.

DETAILED DESCRIPTION OF THE INVENTION

Figure 1:
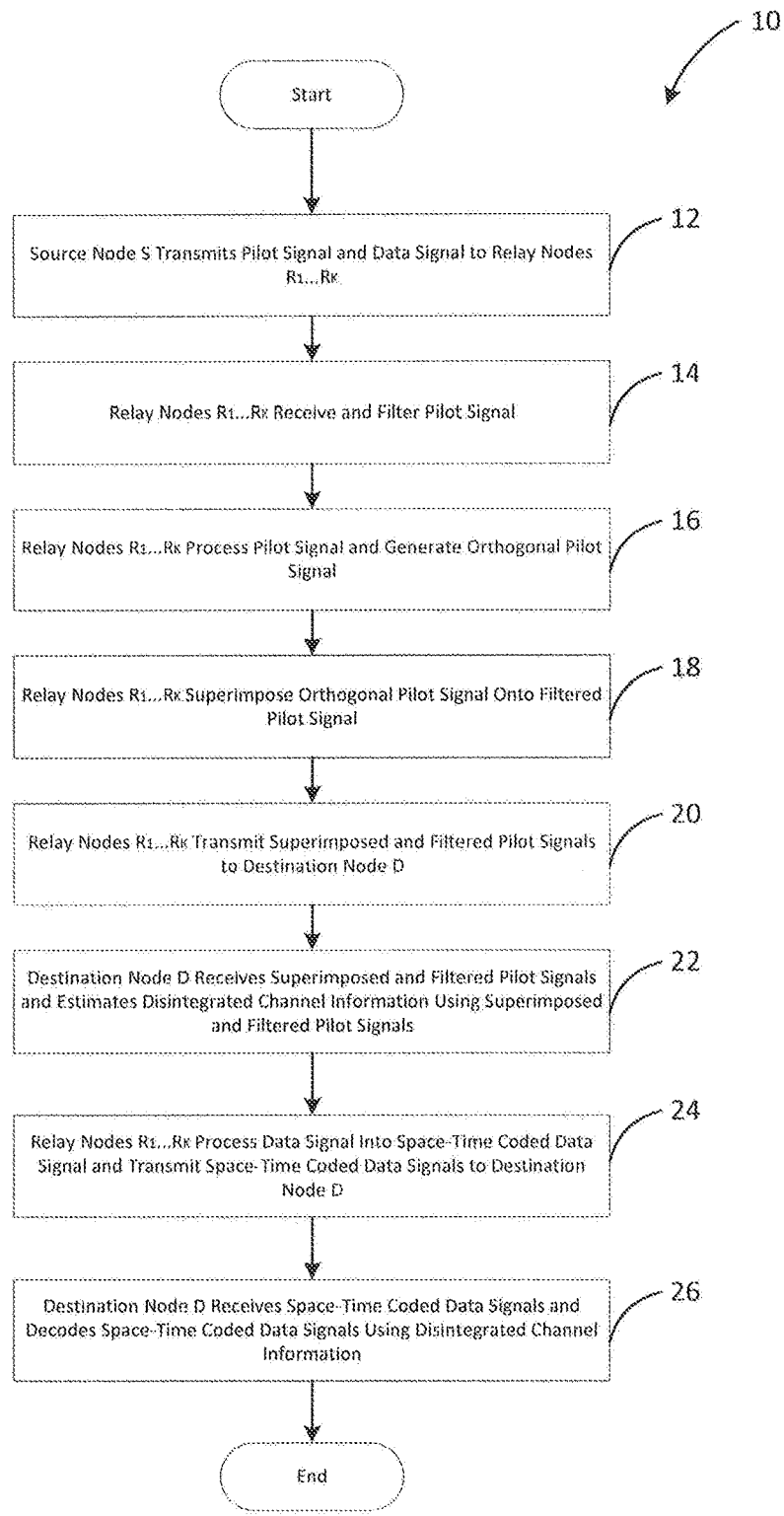
FIG. 1 is a flowchart illustrating processing steps carried out by the system of the present disclosure.

The present disclosure relates to a system and method for disintegrated channel estimation in wireless networks, as disclosed herein in detail in connection with FIGS. 1-13.

A generic relaying signal model is disclosed herein to effectively represent the AF and filter-and-forward (FF) relaying variants. The system can oeprate with multiple relays arranged in a parallel manner to accomplish D-STBC. Orthogonal training sequences are generated to assist the destination node in estimating all disintegrated channels. Multi-hop relaying can also be performed by utilizing the superimposed training methods. Rather than choosing the relay gain to minimize the inter-link interference between the source-relay and the source-destination links, the sytem of the present disclosure applies a generalized filtering matrix as a kernel to multiplex the relay pilot sequences prior to the relay-destination transmission. The generalized filtering method of the present disclosure can coordinate the relay pilot sequences by exploiting the time-division multiplexing (TDM), the frequency-division multiplexing (FDM), or the code-division multiplexing (CDM) methods. The system can effectively overcome inter-relay interference (IRI), thereby reducing both the mean square errors (MSEs) of the disintegrated channel estimation and the symbol-error rate (SER) obtained using the STBC in the relay network. The channel estimation technique of the present disclosure can be effectively applied in a scalable FF relay network, especially when a relay selection mechanism is applied or a relay occasionally joins/leaves the currently operating network without changing the bi-phase protocol.

The protocol of the present disclosure can be briefly described as follows. The mobile unit can detect several relays as candidates to support the cooperative communication and then select the required relays to establish STBC. When a relay occasionally joins (or leaves) the currently operating network, the mobile unit can stack it in (or pop one up from) the candidate list without informing the base station because the protocol and the frame structure are unchanged.

Some mathematical notations frequently used herein are summarized as follows. Matrices (uppercase) and vectors (lowercase) are in boldface. $C^{n \times m}$ in and $C^m$ represent the complex matrices of size n×m and complex vectors of size m, respectively. The superscripts $(\cdot)^*$, $(\cdot)^T$, $(\cdot)^H$ and $(\cdot)^{-1}$ represent the complex conjugate, the vector (or matrix) transpose, the Hermitian and the inverse operator, respectively. $\Phi(\cdot)$ denotes a circulant function that converts a vector in $C^n$ into a circulant matrix in $C^{n \times n}$; it aids in representing the circular convolution of the signal and the channel impulse response (CIR) vectors. $\Theta(\cdot)$ denotes a diagonal matrix generating function that allocates the parameter vector into the diagonal terms of a square matrix, $\Theta^{-1}(\cdot)$ denotes an inverse matrix of the diagonal matrix. $F_N$ represents the N-point discrete Fourier transform (DFT) matrix with (p, q)-entry expressed as $$\langle F_N \rangle_{p,q} = \frac{\omega^{pq}}{\sqrt{N}},$$

where p, q=0,1, . . . , N−1 and $$\omega = e^{-j\frac{2\pi}{N}}.$$

Frequency domain (FD) signals are represented as $\tilde{(\cdot)}$, e.g., $\tilde{x}=F_N x$. Additionally, it is noted that the training slot length employed herein is the duration of an OFDM symbol, not a slot that contains 7 OFDM symbols, as defined in the LTE specification. The terms "slot" and "subslot" are employed to avoid the confusion that might arise from the use of the terms "symbol" and "subsymbol."

Figure 2:
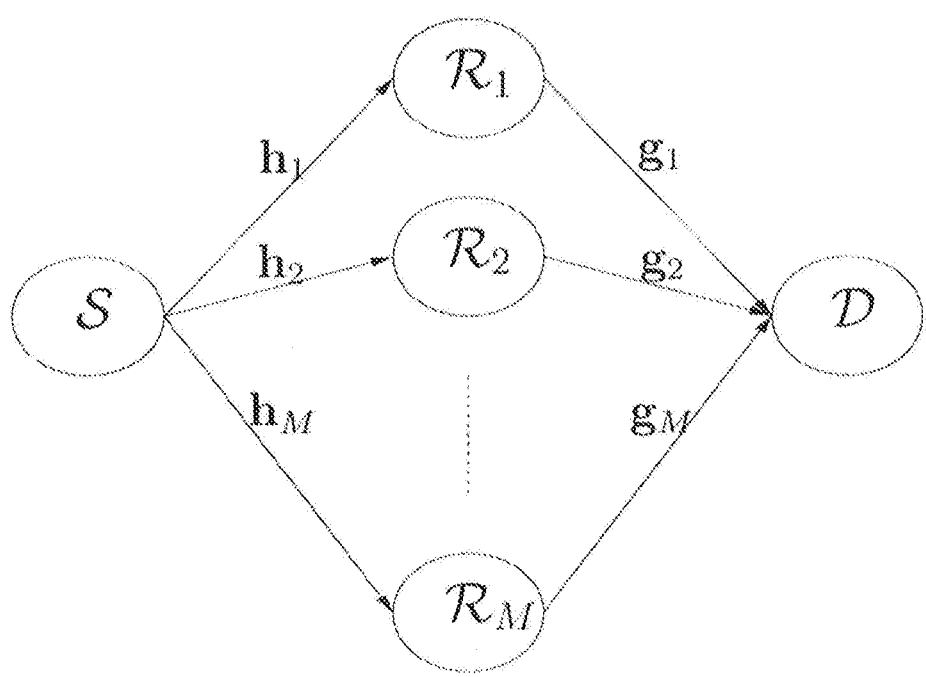
FIG. 2 is a diagram illustrating a relay network in which the system of the present disclosure can be implemented.

Reference is now made to FIGS. 1-2 of the present disclosure, wherein FIG. 1 is a flowchart represnting overall processing steps carried out by the system of the present disclosure and FIG. 2 is a diagram illustrating a sample relay network in which the system of the present disclosure could be implemented. As depicted in FIG. 2, a typical dual-hop multi-relay network consists of one source node denoted as $\mathcal{S}$, M relay nodes, and one destination node denoted as $\mathcal{D}$. The kth relay node is denoted as $\mathcal{R}_k$, where k=1,2, . . . , M. The direct link is absent or is omitted in FIG. 2 solely to focus on the multi-relay channel estimation because the relay-based spatial diversity is usually required when the $\mathcal{S}$-$\mathcal{D}$ signal-to-noise ratio (SNR) is very low such that the $\mathcal{S}$-$\mathcal{D}$ link can be neglected. A quasi-static multipath channel that can usually be represented as a tapped-delay-line (TDL) model is considered here. The channel tap-weighting coefficients are assumed to be constant within a time slot but to vary between slots. The zero-padded CIR vectors are used to give the transmitted signal and CIRs the same length N. The $\mathcal{S}$-$\mathcal{R}_k$ CIR vector is denoted as $h_k=[\check{h}_k^T 0_{1 \times (N-L_h)}]^T \in C^N$, where $\check{h}_k \in C^{L_h}$ is the true CIR vector with length $L_h$. The zero-padded $\mathcal{R}_k$-$\mathcal{D}$ CIR vector is defined as $g_k=[\check{g}_k^T 0_{1 \times (N-L_g)}]^T$, where the true CIR vector $\check{g}_k$ is of length $L_g$. The zero-padded $\mathcal{S}$-$\mathcal{R}_k$-$\mathcal{D}$ CIR vector is represented as $v_k=[\check{v}_k^T 0_{1 \times (N-L_h-L_g+1)}]^T$ where the true CIR vector $\check{v}_k$ is of the effective channel length $L_v=L_h+L_g-1$. Based on cyclic prefix (CP) orthogonal-frequency-division-multiplexing (OFDM) techniques, the channel $v_k$ can be obtained through the circular convolution of $h_k$ and $g_k$ with $v_k=\Phi(h_k)g_k=\Phi(g_k)h_k$. Furthermore, the circulant matrix converted from $v_k$ can be written as $\Phi(v_k)=\Phi(h_k)\Phi(g_k)$. Although the previous equation holds for $L_h+L_g-1 \leq N$, in practice, a stricter requirement of $L_h+L_g-1$ exists: $L_h+L_g-1$ must be less than the CP length in the OFDM communication systems to avoid inter-symbol interference (ISI).

Referring to FIG. 1., a flowchart 10 illustrates the overall process steps carried out by the system of the present disclosure. In describing the steps of flowchart 10 of FIG. 1, reference is also made to FIG. 2. In step 12, the source node $\mathcal{S}$ of FIG. 2 transmits a pilot signal and a data signal to the relay nodes $\mathcal{R}_1 \ldots \mathcal{R}_k$ of FIG. 2. Then, in step 14, the relay nodes $\mathcal{R}_1 \ldots \mathcal{R}_k$ receive and filter the pilot signal. In step 16, the relay nodes $\mathcal{R}_1 \ldots \mathcal{R}_k$ process the pilot signal and generate an orthogonal pilot signal. Next, in step 18., the relay nodes $\mathcal{R}_1 \ldots \mathcal{R}_k$ superimpose the orthogonal pilot signal onto the filtered pilot signal. In step 20, the relay nodes $\mathcal{R}_1 \ldots \mathcal{R}_k$ transmit the superimposed and filtered pilot signals to the destination node $\mathcal{D}$ of FIG. 2. Then, in step 22, the destination node $\mathcal{D}$ receives the superimposed and filtered pilot signals, and estimates the disintegrated channel information using the superimposed and filtered pilot signals. In step 24, the relay nodes $\mathcal{R}_1 \ldots \mathcal{R}_k$ of FIG. 2 each process the data signal a into space-time coded data signal and transmit the space-time coded data signal to the destination node $\mathcal{D}$. Finally, in step 26, the destination node $\mathcal{D}$ receives the spce-time coded data signals from the relay nodes $\mathcal{R}_1 \ldots \mathcal{R}_k$ and decodes the space-time coded data signals using the estimated disintegrated channel information.

The processing steps discussed above in connection with FIGS. 1-2 will now be described in greater detail. It is noted that, in the present disclosre, a wireless CP-OFDM communication system is considered having a block-type pilot arrangement in which training signals are transmitted periodically via all subcarriers.

The basic transmission protocol of a relay network is often composed of two phases. In the first phase, the relay nodes receive the signal transmitted from the source node. The received signal on the kth relay can be written as:

$$y_k = \sqrt{P_s}\Phi(h_k)u_S + n'_k, \quad (1)$$

where $u_s$ is the training signal transmitted from $\mathcal{S}$, $P_s$ denotes the transmitted power of the training signal, $\Phi(h_k)$ denotes the circulant CIR matrix of the $\mathcal{S}$-$\mathcal{R}_k$ link, and $n'_k$ is an additive white Gaussian noise (AWGN) introduced at $\mathcal{R}_k$. In the second phase, any individual relay $\mathcal{R}_k$ sends a signal to node $\mathcal{D}$ with or without further signal processing, depending on the relaying strategy. The generic relaying model considered herein can be represented in the form of a matrix linear equation, and the received signal at $\mathcal{D}$ can be expressed as:

$$y_D = \Sigma_{k=1}^{M}[\Phi(g_k)(W_k y_k + u_k)] + n_D, \quad (2)$$

where $\Phi(g_k)$ is the circulant CIR matrix of the $\mathcal{R}_k$-$\mathcal{D}$ link and $n_D$ denotes the AWGN at $\mathcal{D}$. A general filtering matrix $W_k$ and a superimposed signal vector $u_k$ are jointly employed in (2) to consider various relaying strategies.

In the information-bearing transmission, D-STBC are employed to achieve the spatial diversity. To utilize the D-STBC technique in relay networks, the symbols on the relay nodes should be altered in accordance with its cooperative pattern. For example, considering a 2-relay network, the relay should be capable of storing two symbols to conduct the rearrangement. In the first phase, $\mathcal{R}_k$ receives the signal from $\mathcal{S}$ on the mth symbol block, $$y_{k,m} = \Phi(h_k)x_m + n_{k,m}, \quad (3)$$

where k and m denote the relay index and the stored symbol index, respectively, and $x_m$, is the mth data block transmitted from $\mathcal{S}$. The coding matrix can be expressed as:

$$Y_R = \begin{bmatrix} y_{1,1} & -y_{2,2}^* \\ y_{1,2} & y_{2,1}^* \end{bmatrix}. \quad (4)$$

If a set of data signals transmitted from $\mathcal{S}$ is $[x_1^T x_2^T]^T$, then by using equation (3) and the STBC arrangement in equation (4) and taking the complex conjugate on the second symbol of the received signal, the signal received in $\mathcal{D}$ can be expressed as:

$$\begin{bmatrix} y_{D,1} \\ y_{D,2}^* \end{bmatrix} = \quad (5)$$

-continued
$$\begin{bmatrix} \alpha_1\Phi(g_1)\Phi(h_1) - \alpha_2\Phi(g_2)\Phi^*(h_2) \\ \alpha_2\Phi(h_2)\Phi^*(g_2)\alpha_1\Phi^*(h_1)\Phi^*(g_1) \end{bmatrix}\begin{bmatrix} x_1 \\ x_2^* \end{bmatrix} + \begin{bmatrix} \alpha_1\Phi(g_1)n_{1,1} - \alpha_2\Phi(g_2)n_{2,2}^* \\ \alpha_1\Phi^*(g_1)n_{1,2}^* + \alpha_2\Phi^*(g_2)n_{2,1} \end{bmatrix} + \begin{bmatrix} n_{D,1} \\ n_{D,2}^* \end{bmatrix}.$$

Because the relay nodes herein are assumed to be unable to acquire $\mathcal{S}$-$\mathcal{R}_k$ CSI through channel estimation, the filtering matrix $W_k$ in the data transmission duration is thus chosen as an identity matrix with a constant gain $\alpha_k I$, which can be considered as a fixed-gain AF relaying scenario.

To detect the STBC signal, the matrix in the first term of equation (5) should be evaluated first. However, the off-diagonal terms containing $\Phi(g_2)\Phi^*(h_2)$ and $\Phi(h_2)\Phi^*(g_2)$ cannot be obtained directly from equation (2). Therefore, the STBC technique unavoidably requires disintegrated channel estimation. To keep the relay complexity low, a relay does not estimate the $\mathcal{S}$-$\mathcal{R}_k$ channel, and $\mathcal{D}$ is the only node to conduct channel estimation.

A technique that effectively maintains the currently existing protocols, spectral efficiency, and network scaleability in multi-relay networks is highly desired, and its development is one goal of the present disclosure. From equation (2), if the filtering matrix $W_k$ is substituted by $\alpha_k I$, the signal model of the AF relaying strategy assisted from the superimposed training sequences can be obtained as:

$$y_D = \sqrt{P_s}\Sigma_{k=1}^{M}[\alpha_k\Phi(g_k)\Phi(h_k)]u_S + \Sigma_{k=1}^{M}\sqrt{P_k}\Phi(g_k)u_k + \Sigma_{k=1}^{M}\alpha_k\Phi(g_k)n_k + n_D, \quad (6)$$

where $\alpha_k$ denotes the gain of $\mathcal{R}_k$. The individual $\mathcal{R}_k$-$\mathcal{D}$ CIR vector $g_k$ can be estimated at $\mathcal{D}$ via the corresponding relay pilot $u_k$. The source pilot $u_s$ can be employed to estimate the compound $\mathcal{S}$-$\mathcal{R}$-$\mathcal{D}$ channel, $v = \Sigma_{k=1}^{M}[\alpha_k\Phi(g_k)\Phi(h_k)]$, as in the first term of equation (6). In a parallel multi-relay scenario, individual $\mathcal{S}$-$\mathcal{R}_k$ CIR vectors, $h_k$, k=1,2, . . . , M, are mixed with each other and cannot be separately estimated; thus, IRI is unavoidable. To generalize the application of multi-relay networks, a novel filtering strategy to address IRI in conjunction with a superimposed training method is proposed.

The system of the present disclosure can be considered a FF relaying strategy with superimposed training sequences (FF/SITS). By inserting the received signal on the kth relay as written in equation (1) into (2), the received signal at $\mathcal{D}$ can be rewritten as $y_D = \sqrt{P_s}\Sigma_{\kappa=1}^{M}\Phi(g_\kappa)W_\kappa\Phi(h_\kappa)u_S + \Sigma_{\kappa=1}^{M}\sqrt{P_\kappa}\Phi(g_\kappa + \Sigma_{\kappa=1}^{M}\Phi(g_\kappa)n_\kappa + n_D$, where $n_\kappa = W_\kappa n'_\kappa$. If $W_k$ is chosen to be a circulant matrix with relay gain $\alpha_k$, $y_D$ can be reformulated as:

$$y_D = \sqrt{P_s}\Sigma_{k=1}^{M}\alpha_k\Phi(g_k)\Phi(h_k)u_{S,k} + \Sigma_{\kappa=1}^{M}\sqrt{P_\kappa}\Phi(g_\kappa)u_\kappa + \Sigma_{K=1}^{M}\alpha_k\Phi(g_\kappa)n_\kappa + n_D, \quad (7)$$

Hereafter, $\alpha_k$ is set to 1 in order to focus on the work of the filter $W_k$, $u_{S,k} = W_k u_S$ according to the relation: $W_k\Phi(h_k)u_S = \Phi(h_k)W_k u_S$. In equation (7), the first term is the desired term for conducting the $\mathcal{S}$-$\mathcal{R}$-$\mathcal{D}$ channel estimation by means of $u_{S,k}$; the second term is the desired term for conducting the $\mathcal{R}_\kappa$-$\mathcal{D}$ estimation by means of $u_\kappa$; the third term denotes the relay noises experiencing $\mathcal{R}_\kappa$-$\mathcal{D}$ links; and the fourth term represents the destination noise. In the filtering process, all the pilots must be chosen such that the following orthogonality requirements are satisfied:

$$\frac{1}{N} A_L \Phi^H(u_k) u_k = e_1 \delta[k - \kappa], \quad (8)$$

$$\frac{1}{N} A_L \Phi^H(u_{S,k}) u_{S,k} = e_1 \delta[k - \kappa],$$

$$\frac{1}{N} A_L \Phi^H(u_{S,k}) u_k = 0,$$

where $\delta[\cdot]$ represents the discrete-time Kronecker delta function, k, $\kappa$ 68 $\{1,2, \ldots, M\}$, $A_L=[I_L 0_{L \times (N-L)}]_{L \times N}$ is a segmenting matrix that consists of an identity matrix and a zero matrix, L denotes the maximum delay spread or may simply be set as the CP length to consider the worst condition, and $e_1=[1 0_{1 \times (N-1)}]^T$ denotes the N×1 elementary vector. In equation (8), the first orthogonal requirement is adopted to separate the channel estimations between $g_k$ and $g_\kappa$; the second orthogonal requirement is adopted to separate the channel estimations between $v_k$ and $v_\kappa$; and the third orthogonal requirement is adopted to separate the channel estimations between the links of $S$-$\mathcal{R}_k$-$\mathcal{D}$ and $\mathcal{R}_\kappa$-$\mathcal{D}$. The orthogonality requirements hold if the degrees of freedom of the CSI are assumed to be lower than the CP length. $W_k$ is utilized to effectively multiplex the CSIs on different links in either the time domain (TD) or the FD to maintain the orthogonality. To obtain complete knowledge of the disintegrated channels, the maximum number of relays under the coordination of the proposed filtering method cannot exceed N/2L. The third orthogonality requirement is also met. Three primary multiplexing methods, TDM, FDM and CDM, are applied here to the parallel multi-relay scenario to satisfy the first and second orthogonality requirements.

The TDM approach equally partitions a single training time slot[1] into M subslots, within any of which a relay node $\mathcal{R}_\kappa$ sends its own relay pilot $u_\kappa$. To achieve the filter function described in equation (7), a filter arranges $S$-$\mathcal{R}_k$ channel information to a segmented orthogonal pilot $\bar{u}_{S,k}$. Therefore, the kth relay filtering matrix can be formulated as:

$$W_k \triangleq D_{T,k}^H \Phi(\bar{u}_{S,k}) A_{N_r} W_{FDLS},$$

$$k=1,2,\ldots,M, \quad (9)$$

where "$\triangleq$" represents "defined as"; $u_{S,k}=F_N^H D_{T,k} \tilde{u}_S$ a segmented version of the source pilot with length $N_r$, $N_r$ is the length of $u_{S,k}$; $W_{FDLS}=F_N^H \Theta^{-1}(\tilde{u}_S) F_N$; $A_{N_r}=[I_{N_r} 0_{N_r \times (N-N_r)}]_{N_r \times N}$; and the matrix $D_{T,k}$ consists of an $N_r \times N_r$ identity matrix and zeros in the remaining terms, i.e.:

$$D_{T,k}=[T_1 0_{N_r \times N_{cp}} T_2 \ldots 0_{N_r \times N_{cp}} T_M]_{N_r \times N}, \quad (10)$$

Figure 3:
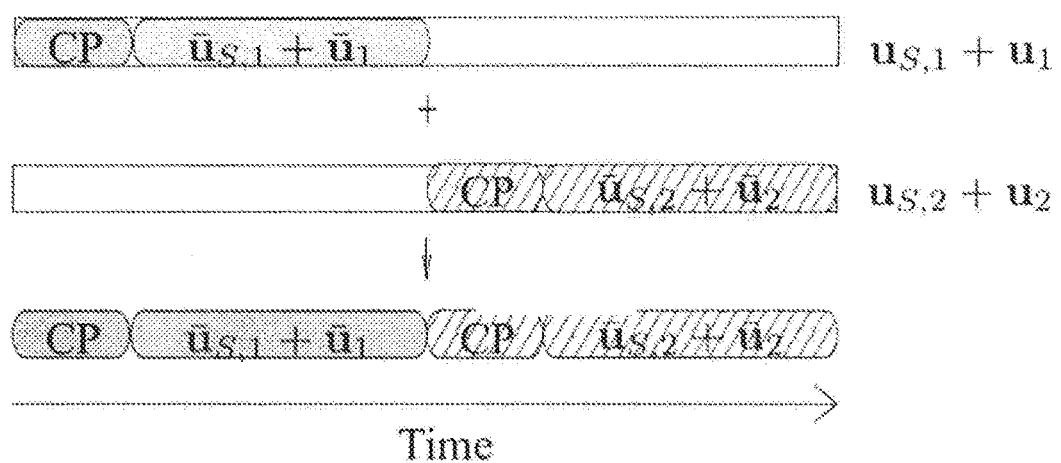
FIG. 3 is diagram illustrating a pilot structure implemented in a wreless network having 2 relays are arranged in parallel.

$T_j=I_{N_r} \delta[j-k]$, $0_{N_r \times N_{cp}}$ is employed to reserve a CP insertion, and zero padding may be needed if $N>MN_r+(M-1)N_{cp}$. In equation (9), $W_{FDLS}$ conducts the FD least squares (LS) channel estimation of the $S$-$\mathcal{R}_k$ channel, and $W_{FDLS}$ can be replaced by any $S$-$\mathcal{R}_k$ channel estimation, e.g., a TD LS channel estimation: $W_{TDLS}=(\Phi^H(u_S)\Phi(u_S))^{-1}\Phi^H(u_S)$. The FD LS channel estimate is then segmented to $N_r$ by $A_{N_r}$. For practical considerations and to clarify the major contribution, the LS channel estimation is chosen. Using $D_{T,k}$, the segmented channel estimate of $S$-$\mathcal{R}_k$ is then placed in the kth subslot. As an example, the pilot structure employed in the scenario in which 2 relays are arranged in parallel is depicted in FIG. 3, which illustrates a training slot structure of the FF/TDM-SITS in a 2-parallel-relay network. In FIG. 3, $\tilde{u}_i$ denotes a segmented version of $u_i$, i=S, 1,2; and $\tilde{u}_k$ is a segmented relay pilot, which is orthogonal to $\tilde{u}_{S,k}$ and to the other relay pilots. Each subslot preserves a CP interval to avoid the inter-block interference (IBI) caused by the multipath fading channel. Because the degree of freedom of the signal vector space is limited, the segmenting length in TDM approach must meet the following requirements: $N \geq MN_r+(M-1)N_{cp}$, $N_r \geq 2N_{cp}$. Because all matrices are well-defined and pre-determined on $\mathcal{R}_k$, $W_k$ in equation (9) can be pre-calculated and pre-stored.

At destination node $\mathcal{D}$ (see FIG. 2), the kth subslot of $y_D$ is sifted by $\tilde{y}_{D,k}=D_{T,k} y_D$, k=1,2, ..., M. Using equation (8), $g_k$ can be estimated with:

$$\hat{g}_k = \frac{1}{N_r \sqrt{P_k}} A_{L,N_r} \Phi^H(\bar{u}_k) \bar{y}_{D,k}, k=1, 2, \ldots, M, \quad (11)$$

where $A_{L,N_r}=[I_L 0_{L \times (N_r-L)}]_{L \times N_r}$. Meanwhile, the channel estimation of the cascaded CIR vector $v_k$ of $S$-$\mathcal{R}_k$-$\mathcal{D}$ can be conducted by:

$$\hat{v}_k = \frac{1}{N_r \sqrt{P_S}} A_{L,N_r} \Phi^H(\bar{u}_{S,k}) \bar{y}_{D,k}, k=1, 2, \ldots, M. \quad (12)$$

Using the above channel estimates, the $S$-$\mathcal{R}_k$ CIR vector $h_k$ can be estimated using the LS criterion, i.e.:

$$\hat{h}_k=(\Phi^H(\hat{g}_k)\Phi(\hat{g}_k))^{-1}\Phi^H(\hat{g}_k)\hat{v}_k,$$

$$k=1,2,\ldots,M. \quad (13)$$

Figure 4:
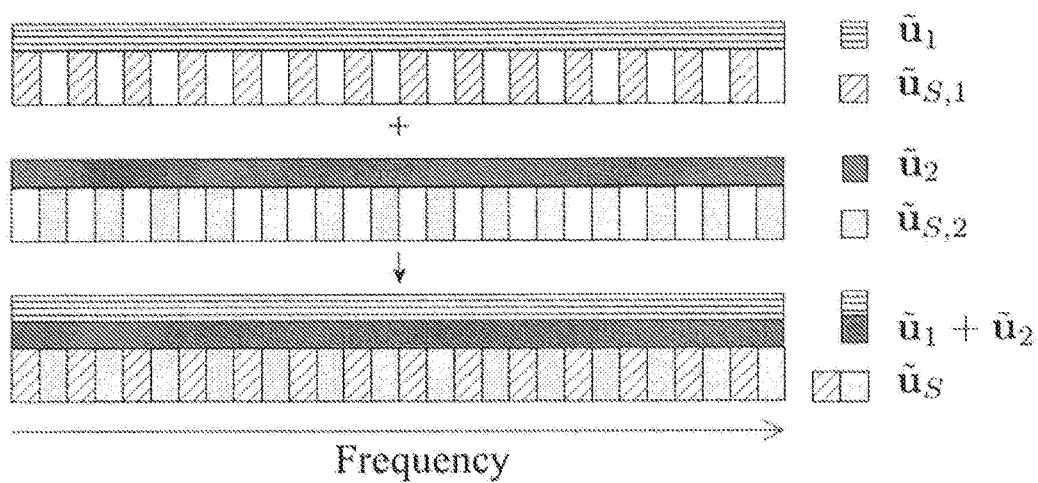
FIG. 4 is a diagram illustrating a subcarrier arrangement of an FF/FDM-SITS training slot in a 2-parallel-relay network.

As disclosed above, the channel estimates of different $S$-$\mathcal{R}_k$ links are allocated to the interleaved subslots for an TDM approach. In effect, the FDM approach interleaves the channel estimates of different $S$-$\mathcal{R}_k$ links onto different subcarriers. Therefore, the filtering matrix on the kth relay node can be formulated as:

$$W_k \triangleq F_N^H \tilde{D}_{F,k} F_N, k=1,2,\ldots,M, \quad (14)$$

where $\tilde{D}_{F,k}$ denotes the subcarrier sift matrix that is a diagonal matrix consisting 1's or 0's, i.e., $$\tilde{D}_{F,k} = \Theta\{d_1 d_2 \ldots d_N\}, \quad (15)$$

$$d_i = \begin{cases} 1 & i \bmod M = k \\ 0 & i \bmod M \neq k \end{cases},$$

mod denotes the modulo operator. The $S$-$\mathcal{R}_k$ CSI are projected to different dimensions by filtering the signal sent from $S$. A commonly used allocation method is to load individual relay pilots onto equally spaced subcarriers. An example of the subcarrier arrangement in a 2-parallel-relay network is shown in FIG. 4, which illustrates a subcarrier arrangement of an FF/FDM-SITS training slot in a 2-parallel-relay network. In FIG. 4, $\tilde{u}_{S,k}$, k=1,2..., M denotes the distributed source pilots, which are allocated to equally spaced subcarriers, and $\tilde{u}_k$, k=1,2, ..., M denotes the kth FD relay pilot.

At destination node $\mathcal{D}$ (see FIG. 2), the individual $\mathcal{R}_k$-$\mathcal{D}$ CIR vector $g_k$ can be estimated by:

$$\hat{g}_k = \frac{1}{N \sqrt{P_k}} A_L \Phi^H(u_k) y_D, k=1, 2, \ldots, M. \quad (16)$$

The compound channel of the link $\mathcal{S}$-$\mathcal{R}$-$\mathcal{D}$ can be estimated as:

$$\hat{v} = \frac{1}{N\sqrt{P_S}}\Theta(A_B)\Phi^H(u_S)y_D, \quad (17)$$

where the vector $A_B=[1_L{}^T 0_{N/M-L}{}^T 1_L{}^T 0_{N/M-L}{}^T \ldots 1_L{}^T 0_{N/M-L}{}^T]_{1\times N}{}^T$. To individually estimate the cascaded channel of $\mathcal{S}$-$\mathcal{R}_k$-$\mathcal{D}$, k=1,2, ..., M, $\hat{v}$ should first be transformed into the FD. The $\mathcal{S}$-$\mathcal{R}_k$-$\mathcal{D}$ CSI can be extracted from the interleaved subcarriers by means of $\tilde{D}_{F,k}$, and the FD estimates on the interleaved subcarriers are then interpolated by $\tilde{L}_k$. If TD channel estimation is required, $F_N{}^H$ is applied. Therefore, $\mathcal{S}$-$\mathcal{R}_k$-$\mathcal{D}$ can be estimated by:

$$\hat{v}_k = A_L F_N{}^H \tilde{L}_k \tilde{D}_{F,k} F_N \hat{v},$$

$$k=1,2,\ldots,M. \quad (18)$$

where $\tilde{L}_k$ represents an interpolation operator in the FD. Because the signal after $\tilde{D}_{F,k}$ is considered as expended channel samples in the FD, the signal would be interpolated in the TD after the inverse DFT (IDFT) operation. Utilizing the channel estimates $\hat{g}_k$ and $\hat{v}_k$, $h_k$ can be estimated as in equation (13).

In the CDM approach, the original source pilot must be replaced by the orthogonal source pilots. This process is similar to the TDM approach without the segmenting and reallocating steps, where the replaced pilots must be designed to be orthogonal to other pilots. The filtering matrix can thus be reformulated as:

$$W_k \triangleq \Phi(u_{S,k}) F_N{}^H \Theta^{-1}(\tilde{u}_S) F_N, \text{ k=1,2, ..., M.} \quad (19)$$

Figure 5:
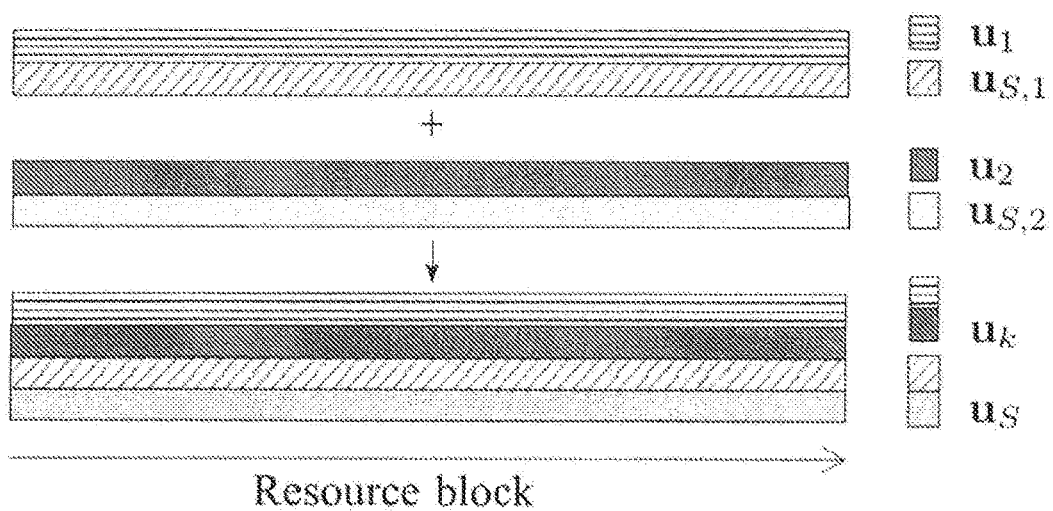
FIG. 5 is a diagram illustrating the slot structure of the CDM approach of the present disclosure in a 2-parallel-relay network.

FIG. 5 presents the slot structure of CDM approach in a 2-parallel-relay network. By following the filtering matrix design in equation (19), the LS channel estimation on the $\mathcal{R}_k$-$\mathcal{D}$ link can be achieved by:

$$\hat{g}_k = \frac{1}{N\sqrt{P_S}} A_L \Phi^H(u_k) y_D, k=1,2,\ldots,M. \quad (20)$$

The cascaded $\mathcal{S}$-$\mathcal{R}_k$-$\mathcal{D}$ CIR vector $v_k$ can be estimated with:

$$\hat{v}_k = \frac{1}{N\sqrt{P_S}} A_L \Phi^H(u_{S,k}) y_D, k=1,2,\ldots,M. \quad (21)$$

Utilizing the channel estimates $\hat{g}_k$ and $\hat{v}_k$, $h_k$ can be estimated as in equation (13). It can be proved that the filtering matrices written in equations (9), (14) and (19) are in the form of a circulant matrix or the equivalent $F_N{}^{-1}\Theta(v)F_N$ [39] and can therefore be considered a TDL filter.

The BCRB of disintegrated channel estimation in single relay scenario has previously been derived. However, multiple relay and filtering matrix are considered into the signal model, and the property of the proposed filtering matrix should be taken into consideration. To extend the derivation from single to multiple relay, a general form of exponential integral function $\varepsilon_n(\cdot)$ has been introduced. As a result, the BCRB is included as a spacial case of our general BCRB derivation. The Fisher information matrix (FIM) can be expressed as:

$$J = E_z\left\{E_{y_D|z}\left\{\left(\frac{\partial \ln p(y_D,z)}{\partial z^*}\right)\left(\frac{\partial \ln p(y_D,z)}{\partial z^*}\right)^H \bigg| z\right\}\right\}, \quad (22)$$

where the parameter z consists of all channel pairs of $\mathcal{S}$-$\mathcal{R}_k$ and $\mathcal{R}_k$-$\mathcal{D}$ links, i.e.:

$$z=[z_1{}^T z_2{}^T \ldots z_M{}^T]^T, \quad (23)$$

and each channel pair $z_k$ contains both $g_k$ and $h_k$, i.e., $z_k = [g_k{}^T h_k{}^T]^T$. The FIM can be shown to be a block diagonal matrix, i.e., $J=\Theta([J_1 J_2 \ldots J_M])$. Each diagonal submatrix of J can be expressed as:

$$J_k = \begin{bmatrix} J_k^{(11)} & J_k^{(12)} \\ J_k^{(21)} & J_k^{(22)} \end{bmatrix}, k=1,2,\ldots,M, \quad (24)$$

where the elements of $J_k$ can be derived as:

$$J_k^{(11)} = \alpha_k^2 \rho_{h_k}^2 c_1 NP_s I + c_1 NP_s I + N\sigma_k^4 \alpha_k^4 c_3 I + R_{g_k}^{-1},$$

$$J_k^{(22)} = \alpha_k^2 c_2 NP_s I + R_{h_k}^{-1},$$

$$J_k^{(12)} = J_k^{(21)} = 0. \quad (25)$$

In equation (25), $\rho_{h_k}^2 = \|h_k\|^2$, $\sigma_k^2 = E\{\|n_k\|^2\}$, $R_{g_k} = E\{g_k g_k{}^H\}$, $R_{h_k} = E\{h_k h_k{}^H\}$; $c_1$, $c_2$ and $c_3$ are shown in equation (26):

$$c_1 = \frac{1}{\sigma_D^2} B e^B \varepsilon_M(B), \quad (26)$$

$$c_2 = \frac{\rho_{g_k}^2}{\sigma_D^2} B e^B \varepsilon_{M+1}(B),$$

$$B = \frac{\sigma_D^2}{\alpha_k^2 \sigma_k^2 \rho_{g_k}^2},$$

$$c_3 = \frac{B^M e^B}{\alpha_k^2 \sigma_D^2 \sigma_k^2 M!}$$

$$\left((-1)^M(e^{-B} - B\varepsilon_1(B)) + \sum_{s=0}^{M-1} \frac{(M-s-1)!(-1)^s}{B^{M-s-1}}\varepsilon_{M-s}(B)\right),$$

where $\rho_{g_k}^2 = \|g_k\|^2$, $\sigma_D^2 = E\{\|n_D\|^2\}$ and $\varepsilon_n(\cdot)$ denotes the general form of exponential integral function defined as $$\varepsilon_n(x) = \int_1^\infty \frac{e^{-xt}}{t^n} dt$$

and has the iterative property $$\varepsilon_{n+1}(x) = \frac{1}{n}(e^{-x} - x\varepsilon_n(x)), n \geq 1.$$

The BCRBs of $g_k$ and $h_k$ can be obtained from the inverses of the diagonal submatrices of the FIM, i.e.:

$$BCRB_{g_k} = tr\{J_k^{(11)-1}\},$$

$$BCRB_{h_k} = tr\{J_k^{(22)-1}\},$$

$$k=1,2,\ldots,M. \quad (27)$$

Based on equations (9), (14), and (19), the MSEs of the proposed disintegrated channel estimation approaches are obtained.

The MSEs of the $\mathcal{R}_k\text{-}\mathcal{D}$ channel estimations can be expressed as equations 28-30, as follows:

$$MSE_{T;\hat{g}_k} = \frac{N_{cp}}{N}\rho_{\hat{g}_k}^2 \eta_k^{-1} + \frac{N_{cp}}{N_r}\eta_D^{-1}, \; FF/TDM\text{-}SITS \quad (28)$$

$$MSE_{F;\hat{g}_k} = \frac{N_{cp}}{N}\left(\frac{1}{M}\sum_{k=1}^{M}\rho_{\hat{g}_k}^2 \eta_k^{-1} + \eta_D^{-1}\right), \; FF/FDM\text{-}SITS \quad (29)$$

$$MSE_{C;\hat{g}_k} = \frac{N_{cp}}{N}\left(\sum_{k=1}^{M}\rho_{\hat{g}_k}^2 \eta_k^{-1} + \eta_D^{-1}\right), \; FF/CDM\text{-}SITS, \quad (30)$$

where $$\eta_k = \frac{P_s}{\sigma_k^2} \text{ and } \eta_D = \frac{P_s}{\sigma_D^2}$$

are the SNRs at the kth relay and the destination, respectively.

The MSEs of the $\mathcal{S}\text{-}\mathcal{R}_k\text{-}\mathcal{D}$ channel estimations can be obtained from those of the $\mathcal{R}_k\text{-}\mathcal{D}$ channel estimations, i.e.:

$$MSE_{T;v} = MSE_{T;g},$$

$$MSE_{F;v} = M \times MSE_{F;g},$$

$$MSE_{C;v} = MSE_{C;g}. \quad (31)$$

The general MSE expressions of the $\mathcal{R}_k\text{-}\mathcal{D}$ channel estimations can be obtained as:

$$MSE_h \geq N_{cp}\frac{\rho_{\hat{h}_k}^2 \sigma_{\hat{g}_k}^2 + \sigma_{\hat{v}_k}^2}{\rho_{\hat{g}_k}^2 + \sigma_{\hat{g}_k}^2}, \quad (32)$$

where $\sigma_{\hat{g}_k}^2$ and $\sigma_{\hat{v}_k}^2$ are the variances of the estimation errors and $e_{\hat{g}_k}$ and $e_{\hat{v}_k}$, respectively.

Computer simulations were conducted to verify the analysis results derived herein and to reconfirm the improvements obtained using the system of the present disclosure. The system studied herein follows the LTE specifications, in which the DFT size is 256 for a 3 MHz bandwidth transmission, the CP length is 18, the sampling rate is 3.84 MHz, the sample duration is 260 ns, and the CP duration is 4.69 μs. In the following simulations, all links, including $\mathcal{S}\text{-}\mathcal{R}_k$ and $\mathcal{R}_k\text{-}\mathcal{D}$, k=1,2, ..., M, are simulated with independent TDL models, in which the tap spacing is commonly set as the sample duration. The TDL parameters are obtained from the reduced variability models in Table A1-19: the International Telecommunication Union (ITU-R) channel model for rural macrocell (RMa) test environments of a non-line of sight (NLoS) scenario. The RMa NLoS channel has a mean delay spread of 21.37 ns, root-mean-square (rms) delay spread of 36.68 ns, and maximum excess delay time of 220 ns, which roughly corresponds to a 2-tap TDL channel model in the studied system. Each tap is simulated as an independent complex Gaussian random variable. To avoid the inter-carrier interference (ICI) effects caused by the random frequency modulation resulting from the relative movement, the simulations are all conducted in the context of block fading. Although the channels are considered to be time-varying, all the tap-weighting coefficients remain unchanged within an OFDM symbol duration and are updated every transmission slot. The quadrature-phase-shift keying (QPSK) mapping with Gray coding is employed. Four parallel relays are simulated and cooperated in ½ code rate STBC. The SNR at $\mathcal{R}_k$ is set to 20 dB to represent moderately noisy conditions.

Figure 6:
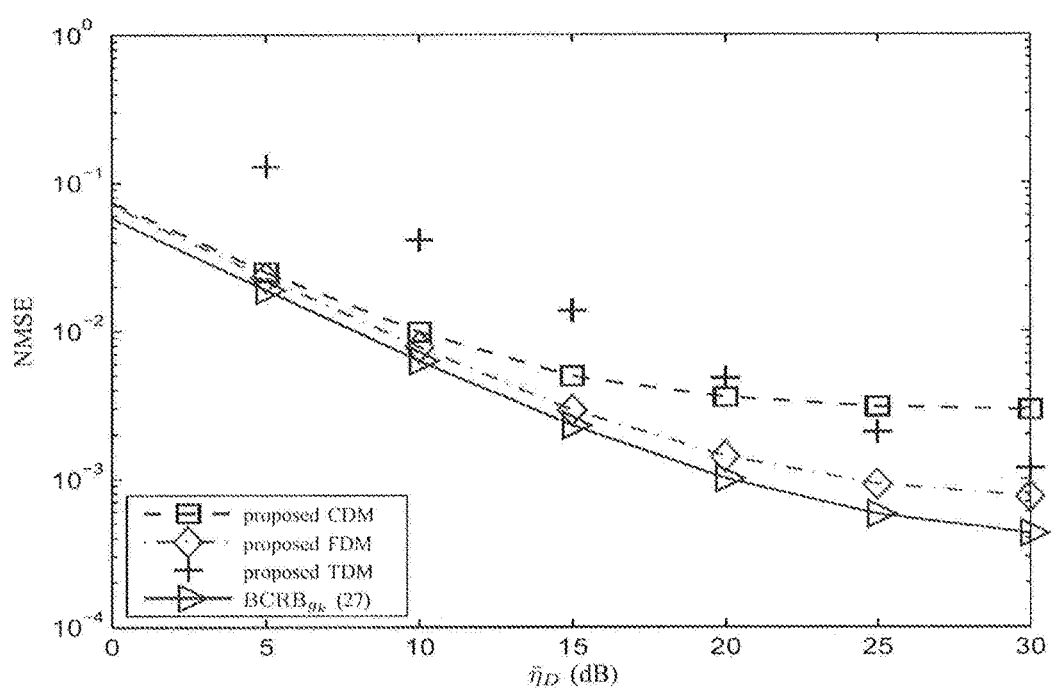
FIGS. 6-12 are diagrams illustrating simulation results performed in connection with the system of the present disclosure.
Figure 7:
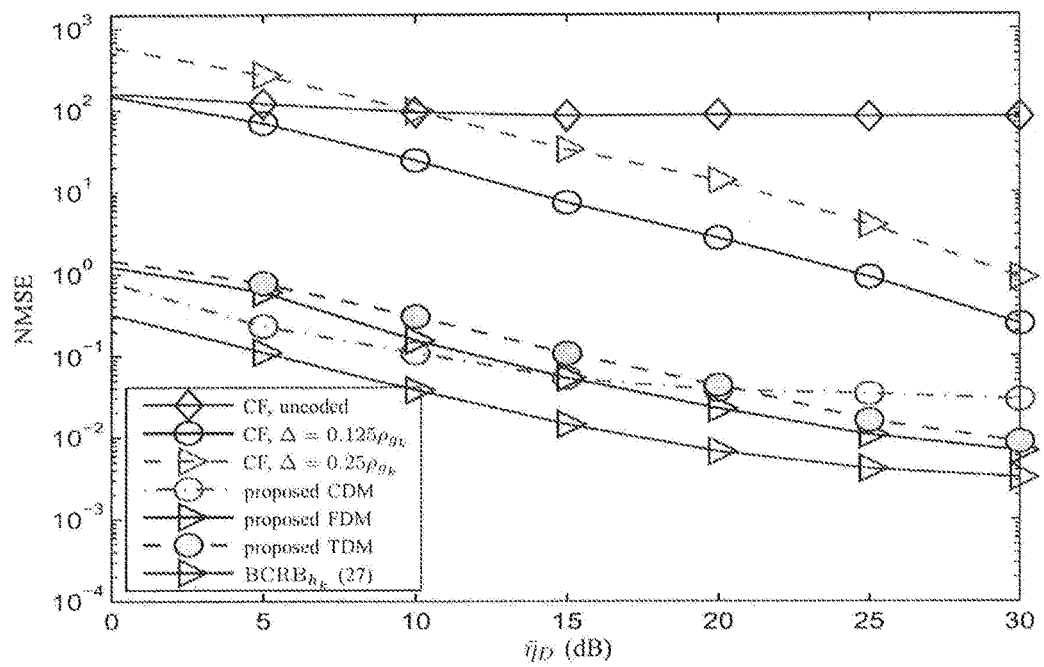

FIGS. 6-7 show the normalized MSEs (NMSEs) for the $\mathcal{R}_k\text{-}\mathcal{D}$ and the $\mathcal{S}\text{-}\mathcal{R}_k$ channel estimations, respectively, obtained using the proposed approaches with 4 parallel relays. For simplicity, xDM is used to represent TDM, FDM and CDM approaches. The simulation results indicate that the NMSEs of the $\mathcal{R}_k\text{-}\mathcal{D}$ and $\mathcal{S}\text{-}\mathcal{R}_k$ channel estimations obtained using the xDM approaches are close to those obtained through the statistical derivations described in equations 28-32. The NMSEs of the $\mathcal{R}_k\text{-}\mathcal{D}$ channel estimation obtained using the FDM and CDM are lower than that obtained using the TDM, in which case $\bar{\eta}_D$ dominates the performance. In practice, the pilot with size N is an up-sampled version of the pilot with size $N_r$ in the channel estimation approach. Therefore, the full-length pilot can benefit channel estimation accuracy by up-sampling the CIR. As shown in equations 28-30, although the segmented pilot in TDM helps to avoid IRI, it unavoidably sacrifices the benefit gained by up-sampling by $N_r/N$ times. Therefore, the FDM and the CDM can achieve lower NMSEs. Comparing FDM with CDM, FDM only uses SITS in $\mathcal{R}_k\text{-}\mathcal{D}$ channel estimation. The IRI obtained is reduced by a factor of 1/M. The simulation with $\bar{\eta}_k$=20 dB shows that the IRI has a small effect on the channel estimation approaches disclosed herein. The NMSEs obtained using the present approaches with LS channel estimations differ by several dBs from the BCRBs derived herein. This can also be observed in the results of previous research on BCRBs, wherein an iterative method was also suggested. Sophisticated estimators other than the LS channel estimation, e.g., a minimum mean-square error (MMSE) channel estimation, may be exploited in conjunction with additional channel statistics to improve the channel estimation performance.

The $\mathcal{S}\text{-}\mathcal{R}_k$ channel estimation can be achieved by the deconvolution of the $\mathcal{S}\text{-}\mathcal{R}_k\text{-}\mathcal{D}$ and $\mathcal{R}_k\text{-}\mathcal{D}$ CIRs in the TD. Meanwhile, the deconvolution process in the TD can be conducted by dividing the estimates of $\mathcal{S}\text{-}\mathcal{R}_k\text{-}\mathcal{D}$ by the estimates of $\mathcal{R}_k\text{-}\mathcal{D}$ in the FD. Because the TD deconvolution or the FD division process inevitably increases the estimation error, the NMSEs of the $\mathcal{S}\text{-}\mathcal{R}_k$ channel estimations are usually higher than those of $\mathcal{R}_k\text{-}\mathcal{D}$ channel estimates. Meanwhile, the FDM spends the advantage earned from its $\mathcal{S}\text{-}\mathcal{R}_k$ channel estimation and $\mathcal{S}\text{-}\mathcal{R}_k\text{-}\mathcal{D}$ channel estimation, as the FD channel reconstruction employed in the FDM results in a non-negligible interpolation error.

The LS channel estimation is employed in the $\mathcal{S}\text{-}\mathcal{R}_k$ channel estimation to allow a fair comparison. Prior studies have shown that a 5 bit/dim quantization process can provide sufficient accuracy for the CF strategy. Without loss of generality and for the simplicity of channel coding, CFs with the 6 bit/dim scheme were simulated. Considering both the in-phase and quadrature-phase components of the CIRs, 12 bit/tap was chosen for the simulations. Furthermore, twice and four times the channel standard deviation $\rho_{g_k}$ were set as the maximum quantization range. The difference between two contiguous quantization levels is uniformly set to be $\Delta=0.125\rho_{g_k}$, $0.25\rho_{g_k}$. Therefore, the quantization noise $\sigma_{q_e}^2$, is $0.0013\rho_{g_k}^2$, $0.0052\rho_{g_k}^2$. A tradeoff apparently exists between the maximum quantization range and the quantization noise. For a higher quantization range, a wide range of channel estimates can be sent to the destination, but the variance of the quantization error unavoidably increases if the number of quantization levels is kept unchanged. In addition, a simple (7,4) cyclic block coding is employed to reduce bit error propagation. As shown in FIG. 6, the NMSEs of the $\mathcal{S}$ - $\mathcal{R}_k$ channel estimation after the channel reconstruction conducted in the destination for the CF strategy are much higher than those obtained using the proposed techniques.

Figure 8:
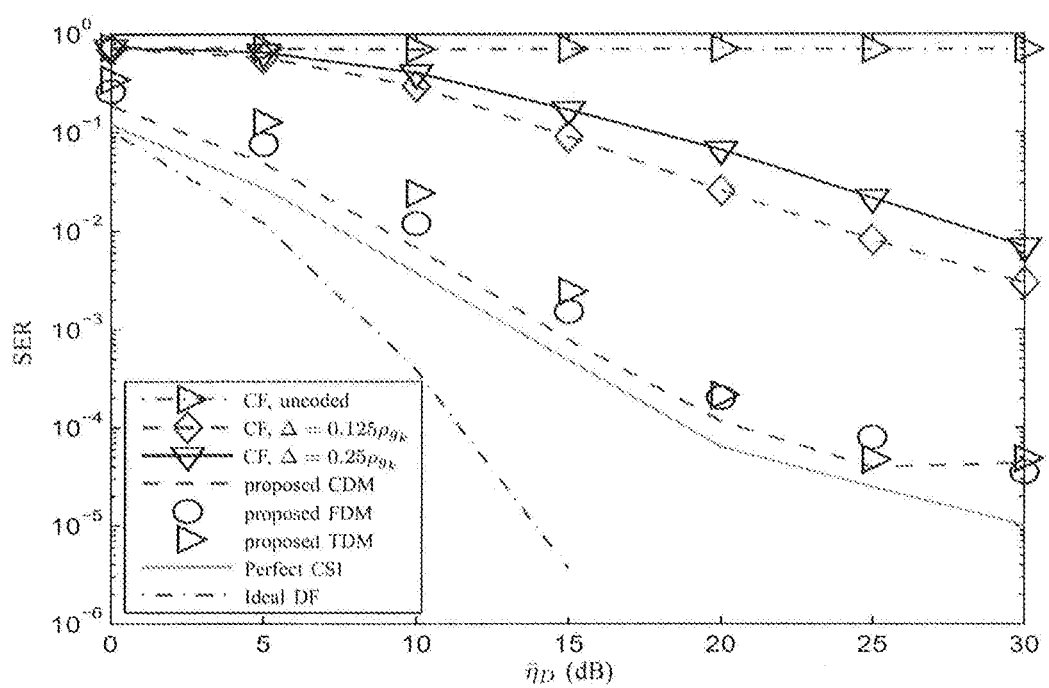

FIG. 8 plots the SER versus the average SNR at a destination obtained using the proposed technique with STBC when the average SNR $\bar{\eta}_k$ at the relay nodes is 20 dB. As $\bar{\eta}_D$ increases from 0 to 30 dB, the error floor begins at approximately $\bar{\eta}_D=\bar{\eta}_k$, and $\bar{\eta}_D>\bar{\eta}_k$ determines the interference-dominant region. This finding shows that the SER performance of the STBC is predominantly determined by $\bar{\eta}_k$ regardless of any increase of $\bar{\eta}_D$ in the interference-dominant region; meanwhile, increasing $\bar{\eta}_k$ cannot reduce the SERs significantly. It can also be observed that the proposed xDM approaches can yield much lower SERs than the CF strategy, even if the CF relaying strategy takes advantage of some basic channel coding. This is mainly because estimation errors are unavoidable in the $\mathcal{S}$ - $\mathcal{R}_k$ channel estimations due to the relay noises, quantization errors are unavoidable in the quantizer at the relay nodes and error also occurs within the signal detection conducted at the destination due to the non-negligible destination noise. An error correction code can help reduce the third impairment but cannot effectively reduce the first two. The SER obtained using the CF relaying strategy can be reduced to those of xDM approaches by increasing $\bar{\eta}_D$ by approximately 20 dB. In other words, the destination noise is the dominant impairment of the three above-mentioned errors in the CF relaying strategy. An ideal DF relaying with STBC is also simulated here. It was also assumed that the signals via $\mathcal{S}$ - $\mathcal{R}$ links are perfectly demodulated and decoded in relays. Then, the relays cooperatively establish D-STBC in the destination.

In summary, the three approaches disclosed herein can successfully perform the disintegrated channel estimation. From the figures, it can be seen that the BCRBs can be considered effective performance benchmarks because the NMSEs obtained using the proposed approaches are close to the derived BCRBs. This finding indicates that the proposed channel estimation approaches can effectively coordinate IRI to achieve low NMSE and thus low SER, as shown in FIG. 8. Even with no assistance from error correction coding, the SER can be as low as $10^{-2}$ to $10^{-4}$ for a moderate SNR at the destination $\bar{\eta}_D$=20 dB. From the MSE derivation and SER simulation, it can be observed that when $\bar{\eta}_D<\bar{\eta}_k$, $\bar{\eta}_D$ dominates the SER performance. Therefore, as $\bar{\eta}_D$ increases, the MSEs and SERs can be reduced. When $\bar{\eta}_D>\bar{\eta}_k$, $\bar{\eta}_k$ dominates the SER performance. Comparing the structures of the proposed estimators, the FDM approach has higher spectral and energy efficiencies because no additional CP is required to avoid IBI and the number of relays limit the filtering matrix.

Because the complexities of achieving the STBCs based on the FF or CF relaying strategies are similar, the complexity comparison may focus on these strategies and the channel estimation processes. The proposed channel estimation approaches are all based on a similar relay filtering process $W_k$. Because an FFT operation requires N $\log_2$N multiplications and a diagonal matrix requires N multiplications, $W_k$ requires 2(N $\log_2$N+$N_r$ $\log_2$ $N_r$)+N+$N_r$ multiplications and 2(N $\log_2$N+$N_r$ $\log_2$ $N_r$)+N accumulations for the TDM, 2N $\log_2$N multiplications and 2N $\log_2$N+N accumulations for the FDM, and 2N $\log_2$ N+N multiplications and 2N $\log_2$N+N accumulations for the CDM. The filtering process $W_k$ of xDM approaches can be pre-calculated and pre-stored on the kth relay after $u_s$ is assigned because all the other components in $W_k$ are constant. In each training cycle, an xDM strategy requires $N^2$ multiplications and $N^2$+N accumulations, in which N accumulations result from superimposing pilots. Considering the channel estimation at $\mathcal{D}$, TDM requires $2N_r$ $\log_2$ N+$N_r$ multiplications, and both CDM and FDM require 2N $\log_2$ N+N multiplications. For a disintegrated channel estimation in a CF relaying network, the FD LS channel estimation requires at least 2N $\log_2$ N+N multiplications and $2N\log_2N$ accumulations per training cycle. Although a CF relay seems to have lower complexity than xDM approaches on a relay node, the complexity of the quantization, compression and forwarding of the source-relay CIR to the destination node has not been taken into account. The xDM strategy employs the original pilot or subcarriers employed by the conventional AF and DF relaying strategies, keeping the protocol unchanged, and therefore has higher relay network scalability and feasibility. However, CF needs to forward the source-relay CIR estimates to the destination; therefore, extra bandwidth is needed. The extra bandwidth is significant; meanwhile, the complexities of quantization, compression and remodulation of the source-relay CIR estimates are also high, even if the protocol can be adjusted accordingly (and/or in a timely manner).

Additional graphs illustrating simulated performance tests in connection with the system of the present disclosure are illustrated in FIGS. 9-12.

Figure 9:
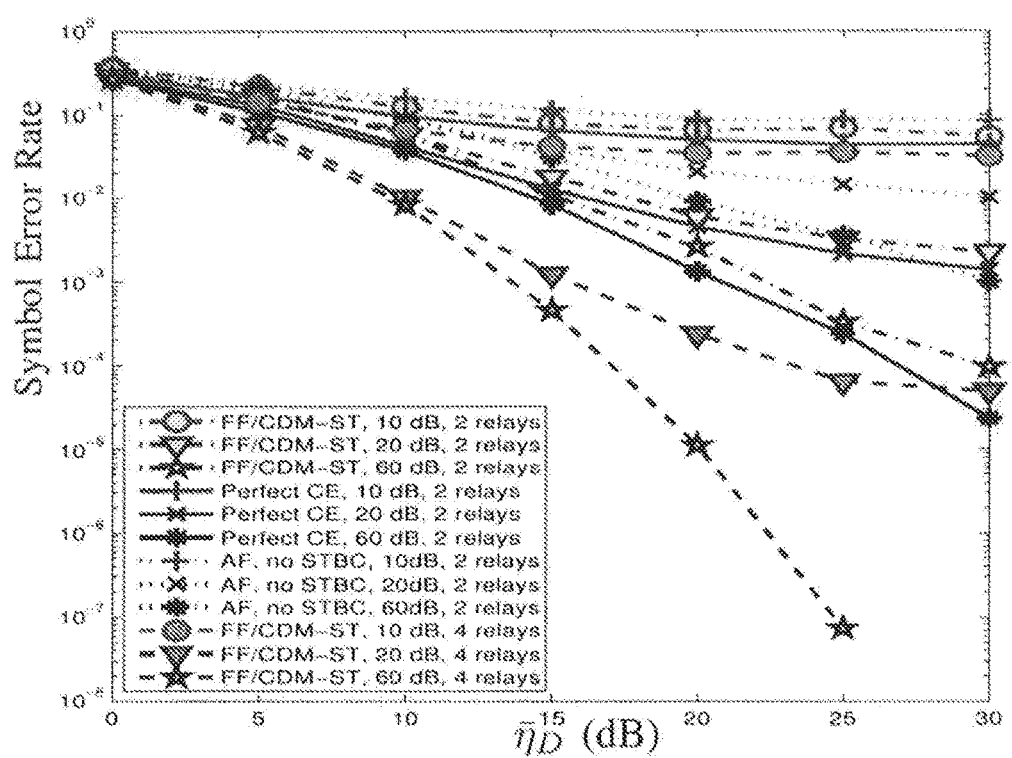

FIG. 9 illustrates the SER versus the average SNR at the destination obtained using the system of the present disclosure with STBC, when the average SNR at the relays $\eta\_{-}R$ is 10, 20 and 60 dB. The SERs obtained using the perfect CE with STBC and the conventional AF technique without STBC are also plotted as comparison baselines. The SERs obtained using FF/CDM-ST with 4 relays are also shown in this figure for comparison. Three things can be observed from FIG. 9: (1) the SERs obtained using the proposed techniques are close to those obtained using the perfect CE on any relay SNR; (2) when the relay SNR is high (≥20 dB), the proposed technique with STBC outperforms the conventional AF and approaches the perfect CE; and (3) when the relay SNR is low (≤10 dB), the CE errors of the proposed methods degrade the performance of the MRC at the destination. Therefore, the system of the present disclosure and the perfect CE can slightly outperform the conventional AF technique. This simulation indicates that spatial diversity can be achieved with accurate disintegrated CE in relay networks, and that the SER performance is significantly affected by the relay SNR.

Figure 10:
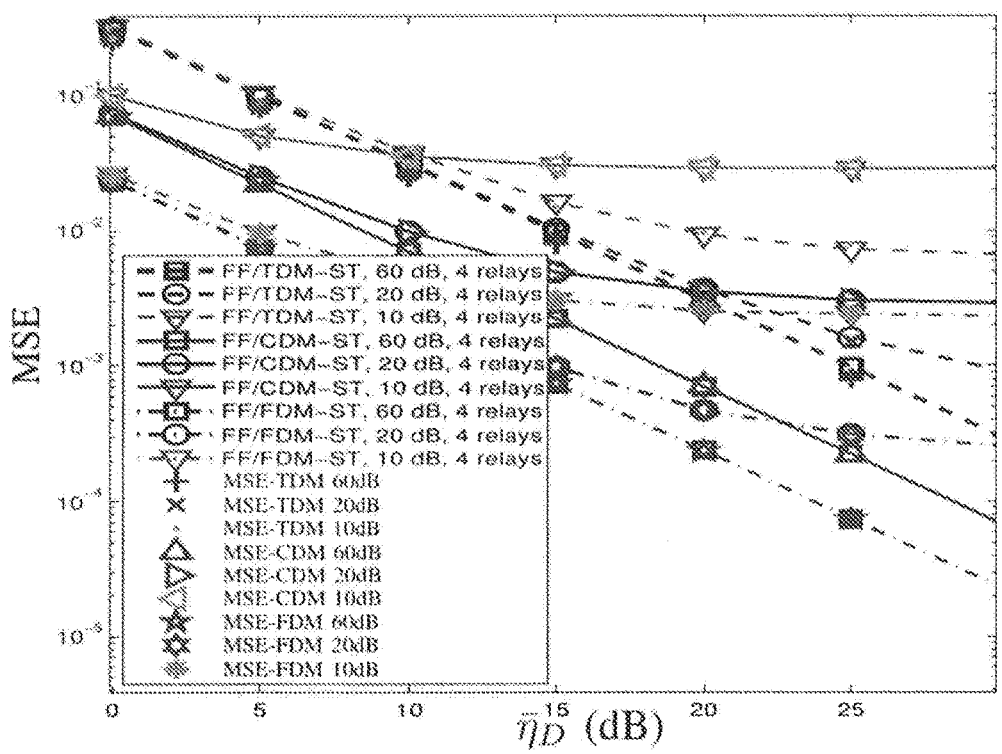

The MSEs of LS CE on R_k-D are shown in FIG. 10. It may be noted that the FF/FDM-ST produces lower estimation errors than FF/CDM-ST and FF/TDM-ST. This is because FF/FDM-ST is implicitly involved with a FD truncator, which functions as an ideal lowpass filter (LPF) suppressing the out-of-band noise. The disadvantage of FF/FDM-ST is that the filtering matrix utilizes more spectrum resources; leading to a stricter limit on the number of relays. Another phenomenon in this simulation shows that if the relay noise grows to a certain level, the crossovers of the MSE curves occur when the relays and the destination have the same noise power. This result indicates that the FF/FDM-ST and FF/CDM-ST techniques have less tolerance to the relay noise but high tolerance to destination noise.

Figure 11:
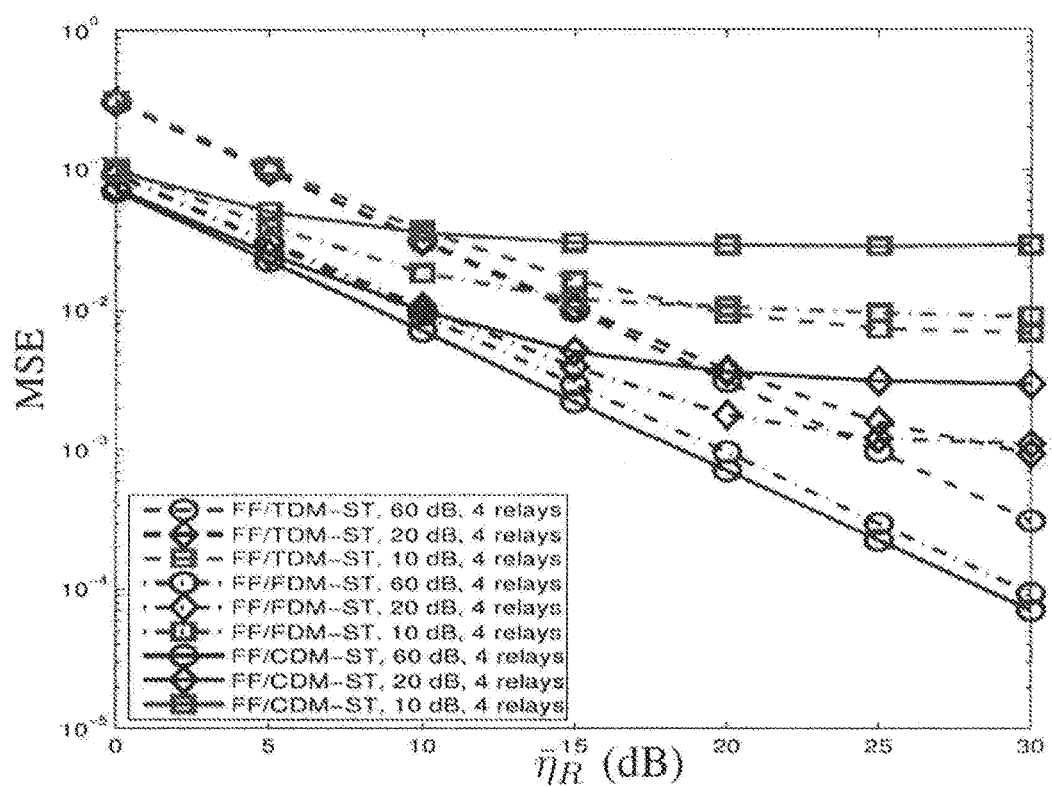
Figure 12:
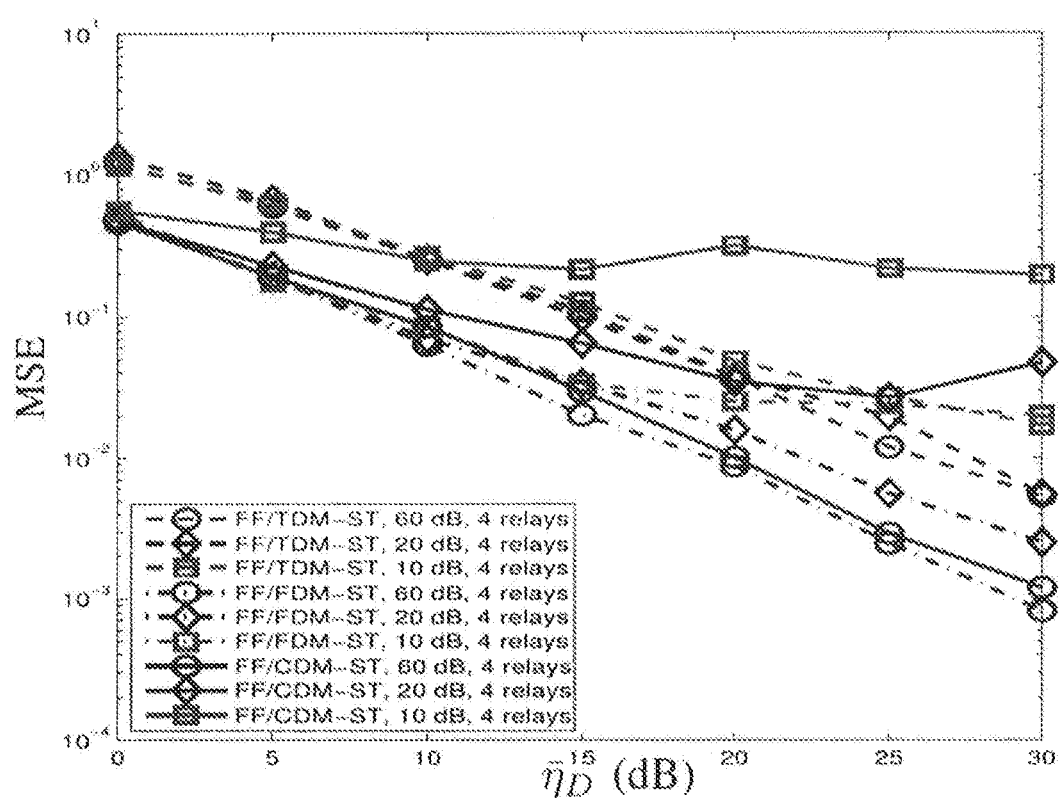

The MSEs of S-R_k-D CE are shown in FIG. 11. The MSEs obtained using the FF/FDM-ST increase slightly, because the FD channel reconstruction employed in the FF/FDM-ST results in a non-negligible interpolation error. The MSEs of S-R_k CE are shown in FIG. 12. The LS S-R_k CE can be obtained through the deconvolution process in the TD or through the division of the S-R_k-D CTF to the R_k-D CTF. The division process results in a noise enhancement problem, which represents the main challenge in deriving a closed-form MSE formulation. The S-R_k CE exhibits a worse performance than the R_k-D and S-R_k-D CE. FIG. 12 also illustrates that the noise enhancement problem increases the MSEs by approximately one half to one order of magnitude.

Figure 13:
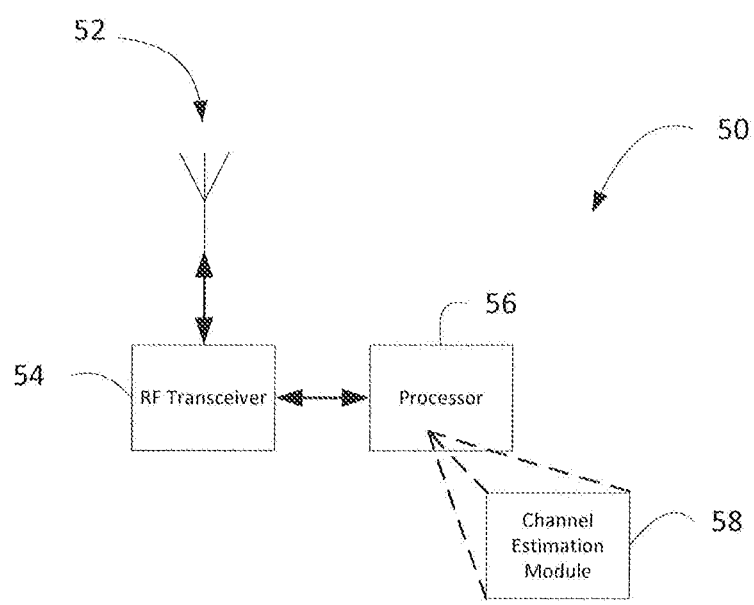
FIG. 13 is a diagram illustrating hardware components capable of implementing the system of the present disclosure.

FIG. 13 is a diagram illustrating hardware components capable of implementing the system of the present disclosure. The system of the present disclosure can be implemented in the relay nodes discussed above in connection with FIG. 2, as well as the destination node discussed therein. The hardware components, indicated generally at 50, could include an antenna system 52 for receiving and transmitting signals, a radiofrequency (RF) transceiver 54, and a processor 56 controlling the transceiver 54. The transceiver 54 and antenna 52 could permit communications using OFDM protocols, and/or could support 3G, 3GPP, 4G, LTE, 5G, and other wireless communication protocols, as well as other protocols. The processor 56 could be a suitable microprocessor, microcontroller, digital signal procesor (DSP), application-specific integratd circuit (ASIC), field-programmable gate array (FPGA), etc. The processing steps disclosed herein could be embodied as a channel estimation module 58 executed by the processor 56, e.g., computer-readable instructions executable by the processor 56. The hardware components 50 could form part of base station equipment, relay node eqiupment, and/or mobile device (e.g., cellular telephone) equipment.

A generic FF relaying strategy with multiplexed superimposed training sequences has been disclosed herein. The generalized filtering approaches effectively multiplex the superimposed training sequences to overcome IRI. Moreover, distinguished channel estimation techniques based on the generalized filtering approaches have been systematically derived, statistically analyzed and compared with the BCRBs.

The following additional equations and derivations are provided for reference.

The FIM in equation (22) can be reformulated as equation (33):

$$J = E_z\left\{E_{y_D|z}\left\{\frac{\partial \ln p(y_D|z)}{\partial z^*}\left(\frac{\partial \ln p(y_D|z)}{\partial z^*}\right)^H + \frac{\partial \ln p(z)}{\partial z^*}\left(\frac{\partial \ln p(z)}{\partial z^*}\right)^H\right\}\right\} \quad (33)$$

By considering the parameter vector z defined in (23), a matrix F can be defined as $$F = E_z\left\{\frac{\partial \ln p(y_D|z)}{\partial z^*}\left(\frac{\partial \ln p(y_D|z)}{\partial z^*}\right)^H\right\} \quad (34)$$

$$= \begin{bmatrix} F_{(11)} & F_{(21)} & \cdots & F_{(M1)} \\ F_{(21)} & F_{(21)} & & \vdots \\ \vdots & & \ddots & \vdots \\ F_{(M1)} & \cdots & \cdots & F_{(MM)} \end{bmatrix},$$

Where $$F_{(km)} = E_{y_D|z}\left\{\frac{\partial \ln p(y_D|z)}{\partial z_k^*}\left(\frac{\partial \ln p(y_D|z)}{\partial z_m^*}\right)^H\right\} \quad (35)$$

$$= \begin{bmatrix} F_{(km)}^{11} & F_{(km)}^{12} \\ F_{(km)}^{21} & F_{(km)}^{22} \end{bmatrix}.$$

from the signal model in (7), the likelihood function can be expressed as equation (36):

$$p(y_D|z) = \frac{1}{\pi^N |R_{n|z}|} \quad (36)$$

$$\exp\left(-\left(y_D - \left(\sum_{k=1}^{M}\sqrt{P_s}\alpha_k\Phi(g_k)\Phi(h_k)u_{S,k} + \sum_{k=1}^{M}\sqrt{P_k}\Phi(g_k)u_k\right)\right)^H\right.$$

$$\left. R_{n|z}^{-1}\left(y_D - \left(\sum_{k=1}^{M}\sqrt{P_s}\alpha_k\Phi(g_k)\Phi(h_k)u_{S,k} + \sum_{k=1}^{M}\sqrt{P_k}\Phi(g_k)u_k\right)\right)\right).$$

The mean and covariance matrix of $y_D$ are obtained as:

$$\mu = \sum_{k=1}^{M}\sqrt{P_s}\alpha_k\Phi(g_k)\Phi(h_k)u_{S,k} + \sum_{k=1}^{M}\sqrt{P_k}\Phi(g_k)u_k \quad (37)$$

$$R_{n|z} = \sum_{k=1}^{M}\alpha_k^2\sigma_k^2\Phi(g_k)\Phi^H(g_k) + \sigma_D^2 I$$

$$= F^H\left\{\Theta\left(\left[\sum_{k=1}^{M}\alpha_k^2\sigma_k^2|\tilde{g}_{k,i}|^2 + \sigma_D^2\right]_{i=1}^{N}\right)\right\}F.$$

To derive a closed form from equation (36), the expectations in equation (38) must be evaluated:

$$E_z\{\Phi^H(h_k)\Phi(h_k)\} = \rho_{h_k}^2 I \quad (38)$$

$$E_z\{R_{n|z}^{-1}\} = E_z\left\{\left(\sum_{k=1}^{M}\alpha_k^2\sigma_k^2\Phi(g_k)\Phi^H(g_k) + \sigma_D^2 I\right)^{-1}\right\}$$

$$= F^H\left(\Theta\left(\left[E_z\left\{\frac{1}{\sum_{k=1}^{M}\alpha_k^2\sigma_k^2|\tilde{g}_{k,i}|^2 + \sigma_D^2}\right\}\right]_{i=1}^{N}\right)\right)F$$

$$= \frac{1}{\alpha_k^2\sigma_k^2\rho_{g_k}^2}\exp\left(\frac{\sigma_D^2}{\alpha_k^2\sigma_k^2\rho_{g_k}^2}\right)\varepsilon_M\left(\frac{\sigma_D^2}{\alpha_k^2\sigma_k^2\rho_{g_k}^2}\right)I = \frac{1}{\sigma_D^2}Be^B\varepsilon_M(B)I = c_1 I$$

$$E_z\{R_{n|z}^{-1}\Phi(g_k)\} = 0$$

$$E_z\{\Phi(g_k)R_{n|z}^{-1}\Phi^H(g_k)\} = \frac{\rho_{g_k}^2}{\sigma_D^2}Be^B\varepsilon_{M+1}(B)I = c_2 I$$

-continued $$E_z\{\Phi(g_k)R_{n|z}^{-2}\Phi^H(g_k)\} = \frac{B^M e^B}{\alpha_k^2 \sigma_D^2 \sigma_k^2} \int_B^\infty \frac{1}{x^M} \varepsilon_{M+1}(x)dx =$$

$$\frac{B^M e^B}{\alpha_k^2 \sigma_D^2 \sigma_k^2 M!}\left((-1)^M(e^{-B} - B\varepsilon_1(B)) + \sum_{s=0}^{M-1} \frac{(M-s-1)!(-1)^s}{B^{M-s-1}} \varepsilon_{M-s}(B)\right)I.$$

From equation (20), by assuming $P_s = P_k$, the LS channel estimation of the $\hat{g}_k$ can be evaluated using equations (7) and (8), i.e., $$\hat{g}_k = g_k + \frac{1}{N\sqrt{P_s}} A_L \Phi^H(u_k)\left(\sum_{k=1}^M (\Phi(g_k)W_k n'_k) + n_D\right).$$

The second term of the above equation represents the estimation error of $\hat{g}_k$ and can be rewritten as:

$$e_{\hat{g}_k} = \frac{1}{N\sqrt{P_s}} A_L \Phi^H(u_k)\left(\sum_{k=1}^M (\Phi(g_k)W_k n'_k) + n_D\right). \quad (39)$$

Considering the generic form of the FF/CDM-SITS filtering matrix on the kth relay, the following should be taken into account:

$$W_k W_k^H = I_N, \quad (1)$$

$$E\{n'_k n'^H_k\} = \sigma_k^2 I_N, \quad (2)$$

$$E\{\Phi(g_k)\Phi g_k^H\} = M(g_k) = \rho_{g_k}^2 I_N, \quad (3)$$

$$\Phi(u_k)^H \Phi(u_k) = N I_N, \quad (4)$$

$$E\{n_D n_D^H\} = \sigma_D^2 I_N, \quad (5)$$

$$A_L A_L^H = I_{N_{ep}}, \quad (6)$$

The covariance matrix of $\hat{e}_{\hat{g}_k}$ can be derived as:

$$M(e_{\hat{g}_k}) = E\{e_{\hat{g}_k} e^H_{\hat{g}_k}\} \quad (40)$$

$$= \frac{1}{N^2 P_s}\sum_{k=1}^M \sigma_k^2\{A_L\Phi^H(u_k)M(g_k)\Phi(u_k)A_L^H\} +$$

$$\frac{1}{N^2}\sigma_D^2\{A_L\Phi^H(u_k)\Phi(u_k)A_L^H\}$$

$$= \frac{1}{NP_s}\left\{\sum_{k=1}^M \rho_{g_k}^2 \sigma_k^2 I_L + \sigma_D^2 I_L\right\}.$$

The MSE can be evaluated with $MSE_{C;\hat{g}_k} = tr\{M(e_{\hat{g}_k})\}$, where $tr\{\cdot\}$ denotes the trace of its matrix argument.

The channel estimation error of $\mathcal{S}-\mathcal{R}-\mathcal{D}$ can be expressed as:

$$e_{\hat{v}_k} = \frac{1}{N\sqrt{P_s}} A_L \Phi^H(u_{S,k})\left(\sum_{k=1}^M (\Phi(g_k)W_k n'_k) + n_D\right). \quad (41)$$

Therefore, the covariance matrix of $e_{\hat{v}_k}$ can be derived as:

$$M(e_{\hat{v}_k}) = E\{e_{\hat{v}_k} e^H_{\hat{v}_k}\} \quad (42)$$

$$= \frac{1}{N^2 P_s}\sum_{k=1}^M E\{A_L\Phi^H(u_{S,k})\Phi(g_k)W_k n'_k n'^H_k W_k^H \Phi^H(g_k)\Phi(u_{S,k})A_L^H\} +$$

$$\frac{1}{N^2 P_s} E\{A_L\Phi^H(u_{S,k})n_D n_D^H \Phi(u_{S,k})A_L^H\}$$

$$= \frac{1}{NP_s}\left\{\sum_{k=1}^M \rho_{g_k}^2 \sigma_k^2 I_L + \sigma_D^2 I_L\right\}.$$

The MSE can thus be evaluated as $MSE_{C;v} = tr\{M(e_{\hat{v}_k})\}$.

The MSE of the $\mathcal{S}-\mathcal{R}_k$ channel estimation is derived in the FD for simplicity. The estimates of $g_k$ and $v_k$ can be expressed as:

$$\hat{\tilde{g}}_k = \tilde{g}_k + e_{\tilde{g}_k} \text{ and } \hat{\tilde{v}}_k = \tilde{v}_k + e_{[|\$|\$\tilde{\ }\$\$[|\$|\$\tilde{\ }A\tilde{x}\tilde{v}_k}, \quad (43)$$

where $e_{\tilde{g}_k}$ and $e_{[|\$|\$\tilde{\ }\$\$[|\$|\$\tilde{\ }A\tilde{x}\tilde{v}_k}$ are the errors occurring with the $\tilde{g}_k$ and $\tilde{v}_k$ channel estimates, respectively. From equation (13), the estimates $\hat{\tilde{g}}_k$ and $\hat{\tilde{v}}_k$ can be obtained by the FD LS channel estimation. Meanwhile, the TD channel estimation can be conducted, and its error can be expressed as:

$$\hat{h}_k = h_k + F_N^H\left(\Theta^{-1}\left(\tilde{g}_k + e_{\tilde{g}_k}\right)\Theta(\tilde{g}_k) - I\right)F_N h_k + F_N^H \Theta^{-1}\left(\tilde{g}_k + e_{\tilde{g}_k}\right)F_N e_{\tilde{v}_k} \quad (44)$$

$$e_{h_k} = \Phi\left(\frac{-e_{\tilde{g}_k}}{g_k + e_{\tilde{g}_k}}\right)h_k + \Phi\left(\frac{1}{g_k + e_{\tilde{g}_k}}\right)e_{\tilde{v}_k}.$$

The division in the above equation is an element-wise division. The $\mathcal{S}-\mathcal{R}_k$ channel can be derived from the $\mathcal{S}-\mathcal{R}_k-\mathcal{D}$ and $\mathcal{R}_k-\mathcal{D}$ channel estimations as:

$$\hat{\tilde{h}}_k = h_k + F_N^H[\Theta^{-1}(\tilde{g}_k + e_{\tilde{g}_k})\Theta(\tilde{g}_k) - I] F_N h_k + F_N^H \Theta^{-1} (\tilde{g}_k + e_{\tilde{g}_k})F_N e_{\tilde{v}_k}. \quad (45)$$

Therefore, the channel estimation error of $\hat{\tilde{h}}_k$ is as written in equation (32), and the covariance matrix is derived as:

$$M(e_{h_k}) = E\{e_{h_k} e^H_{h_k}\} \quad (46)$$

$$= E\left\{\Phi\left(\frac{-e_{\tilde{g}_k}}{g_k + e_{\tilde{g}_k}}\right)h_k h_k^H \Phi^H\left(\frac{-e_{\tilde{g}_k}}{g_k + e_{\tilde{g}_k}}\right) + \Phi\left(\frac{1}{g_k + e_{\tilde{g}_k}}\right)e_{\tilde{v}_k} e^H_{\tilde{v}_k} \Phi^H\left(\frac{1}{g_k + e_{\tilde{g}_k}}\right)\right\}$$

$$\geq \rho_{h_k}^2 \frac{\sigma_{\tilde{g}_k}^2}{\rho_{\tilde{g}_k}^2 + \sigma_{\tilde{g}_k}^2} I_L + \sigma_{\tilde{v}_k}^2 \frac{1}{\rho_{\tilde{g}_k}^2 + \sigma_{\tilde{g}_k}^2} I_L$$

$$= \frac{\rho_{h_k}^2 \sigma_{\tilde{g}_k}^2 + \sigma_{\tilde{v}_k}^2}{\rho_{\tilde{g}_k}^2 + \sigma_{\tilde{g}_k}^2} I_L,$$

where Jensen's inequality is applied. Therefore, the MSE of the $\mathcal{S}-\mathcal{R}_k$ channel estimation can be evaluated with $MSE_{C;h_k} = tr\{M(e_{\hat{h}_k})\}$. The MSEs of the $\mathcal{S}-\mathcal{R}_k$ channel estimations in the proposed TDM and FDM approaches can be derived by substituting the error variances of $\mathcal{S}-\mathcal{R}_k-\mathcal{D}$ and $\mathcal{R}_k-\mathcal{D}$ channel estimation into equation (46).

Based on the signal model in equation (7), the relay matrix of the proposed TDM approach in equation (9) and the $\mathcal{R}_k\text{-}\mathcal{D}$ channel estimation in equation (11), the channel estimation error can be evaluated as:

$$e_{\hat{g}_k} = \frac{1}{N_r\sqrt{P_s}} A_{L,N_r}\Phi^H(D_{T,k}u_k)\{\Phi(A_{L,N_r}g_k)D_{T,k}W_k n'_k + D_{T,k}n_D.\} \quad (47)$$

According to the following:

(1) $D_{T,k}D_{T,m}^H = \begin{cases} I, & k=m \\ 0_N, & k \neq m \end{cases}$, (2) $W_k W_k^H = \frac{N_r}{N} D_{T,k}^H D_{T,k}$, (3) $\Phi(A_{N,g_k})\Phi^H(A_{N,g_k}) = \rho_{g_k}^2 I_{N_r}$, (4) $\Phi(D_{T,k}u_{S,k})\Phi^H(D_{T,k}u_{S,k}) = N_r I_{N_r}$, (5) $A_{L,N_r} A_{L,N_r}^H = I_L$;

the covariance matrix is derived as:

$$M(e_{\hat{g}_k}) = \frac{1}{N_r^2 P_s} \frac{N_r}{N} N_r \rho_{g_k}^2 \sigma_k^2 I_L + \frac{1}{N_r^2 P_s} N_r \sigma_D^2 I_L \quad (48)$$
$$= \frac{1}{NP_s} \rho_{g_k}^2 \sigma_k^2 I_L + \frac{1}{N_r P_s} \sigma_D^2 I_L.$$

The MSE can be evaluated as $\text{MSE}_{T;g} = \text{tr}\{M(e_{\hat{g}_k})\}$.

From the $\mathcal{R}_k\text{-}\mathcal{D}$ channel estimation in equation (12), the channel estimation error can be evaluated as:

$$e_{\hat{v}_k} = \frac{1}{N_r P_s} A_{L,N_r}\Phi^H(D_{T,k}u_{S,k})\{\Phi(A_{N_r}g_k)D_{T,k}W_k n'_k + D_{T,k}n_D\} \quad (49)$$

and the covariance matrix can be written as:

$$M(e_{\hat{v}_k}) = \frac{1}{N_r^2 P_s} \frac{N_r}{N} N_r \rho_{g_k}^2 \sigma_k^2 I_L + \frac{1}{N_r^2 P_s} N_r \sigma_D^2 I_L \quad (50)$$
$$= \frac{1}{NP_s} \rho_{g_k}^2 \sigma_k^2 I_L + \frac{1}{N_r P_s} \sigma_D^2 I_L.$$

The MSE can be evaluated as $\text{MSE}_{T;v} = \text{tr}\{M(e_{\hat{v}_k})\}$.

Based on the signal model in equation (7), the relay matrix of the proposed FDM approach in equation (14) and the $\mathcal{R}_k\text{-}\mathcal{D}$ channel estimation in equation (16), the channel estimation error can be evaluated as:

$$e_{\hat{g}_k} = \frac{1}{N\sqrt{P_s}} A_L \Phi^H(u_k) \sum_{k=1}^{M} (\Phi(g_k)W_k n'_k) + \frac{1}{N\sqrt{P_s}} A_L \Phi^H(u_k) n_D. \quad (51)$$

According to the following facts, (1) $W_k W_k^H = F_N^H D_{F,k} F_N = W_k$, (2) $E\{n'_k n_k'^H\} = \sigma_k^2 I_N$, (3) $E\{\Phi(g_k)\Phi^H(g_k)\} = M(g_k) = \rho_{g_k}^2 I_N$, (4) $\Phi^H(u_k)\Phi(u_k) = NI_N$, (5) $E\{n_D n_D^H\} = \sigma_D^2 I_N$, (6) $A_L A_L^H = I_L$, (7) $A_L W_k A_L^H = \frac{1}{M} I_L$, the covariance matrix of $e_{\hat{g}_k}$ can be derived as:

$$M(e_{\hat{g}_k}) = E\{e_{\hat{g}_k} e_{\hat{g}_k}^H\} \quad (52)$$
$$= \frac{1}{N^2 P_s} \sum_{k=1}^{M} E\{A_L \Phi^H(u_k)\Phi(g_k)W_k n'_k n_k'^H W_k^H \Phi^H(g_k)\Phi(u_k)A_L^H\} +$$
$$\frac{1}{N^2 P_s} E\{A_L \Phi^H(u_k) n_D n_D^H \Phi(u_k) A_L^H\}$$
$$= \frac{1}{NP_s} \left\{ \frac{1}{M} \sum_{k=1}^{M} \rho_{g_k}^2 \sigma_k^2 I_L + \sigma_D^2 I_L \right\}.$$

The MSE can then be evaluated as $\text{MSE}_{F;g_k} = \text{tr}\{M(e_{\hat{g}_k})\}$.

From the $\mathcal{R}_k\text{-}\mathcal{D}$ channel estimation in equation (17), the channel estimation error can be evaluated as:

$$e_{\hat{v}_k} = \frac{1}{N\sqrt{P_s}} A_L F_N^H \tilde{L}_k \tilde{D}_{F,k} F_N \Theta(A_B) \Phi^H(u_S) \left\{ \sum_{k=1}^{M} (\Phi(g_k) n_k) + n_D \right\}. \quad (53)$$

Let $A = A_L F_N^H \tilde{L}_k \tilde{D}_{F,k} F_N A_B$, then $AA^H = MI_L$. Assuming $\sigma_k^2 = \sigma_\kappa^2$ and $\rho_{g_k} = \sigma_{g_\kappa}^2$, the covariance matrix of $\hat{v}_k$ can be derived as:

$$M(e_{\hat{v}_k}) = \frac{1}{N^2 P_s} \sigma_k^2 A \Phi^H(u_S) M(g_k) \Phi(u_S) A^H + \frac{1}{NP_s} \sigma_D^2 I_{N_{cp}} \quad (54)$$
$$= \frac{1}{NP_s} \{\rho_{g_k}^2 \sigma_k^2 I_L + \sigma_D^2 I_L\}.$$

The MSE can be evaluated as $\text{MSE}_{F;v} = \text{tr}\{M(e_{\hat{v}_k})\}$.

Having thus described the invention in detail, it is to be understood that the foregoing description is not intended to limit the scope of the present invention. What is intended to be protected by Letters Patent is set forth in the following claims.

What is claimed is:

1. A system for disintegrated channel estimation in a wireless communication network, comprising:
   a plurality of wireless relay nodes in communication with a source node and a destination node, each of said plurality of wireless relay nodes including a processor, wherein the processors cause the plurality of wireless relay nodes to each:
   receive a pilot signal and a data signal from the source node;
   filter the pilot signal to generate a filtered pilot signal;
   process the filtered pilot signal to generate an orthogonal pilot signal;

superimpose the orthogonal pilot signal onto the filtered pilot signal to generate a superimposed filtered pilot signal; and transmit the superimposed filtered pilot signal to the destination node, wherein the destination node receives the superimposed filtered pilot signals from the plurality of wireless relay nodes and estimates disintegrated channel information using the superimposed filtered pilot signals, wherein the processors further cause each of the plurality of relay nodes to process the data signal into a space-time coded data signal and transmit the space-time coded data signal to the destination node, and wherein the destination node receives the space-time coded data signal and processes the space-time coded data signal using the disintegrated channel information.

2. The system of claim 1, wherein the plurality of relay nodes each operate in a filter-and-forward mode of operation.

3. The system of claim 2, wherein the plurality of relay nodes communicate with the source node and the destination node using time-division multiplexing (TDM).

4. The system of claim 2, wherein the plurality of relay nodes communicate with the source node and the destination node using frequency-division multiplexing (FDM).

5. The system of claim 2, wherein the plurality of relay nodes communicate with the source node and the destination node using code-division multiplexing (CDM).

6. The system of claim 1, wherein the processors cause the plurality of relay nodes to perform filtering to reduce inter-relay-interference.

7. The system of claim 1, wherein the processors cause the plurality of relay nodes to apply a training sequence at each relay node, and to multiplex the training sequences.

8. A method for disintegrated channel estimation in a wireless communication network, comprising the steps of:
receiving a pilot signal and a data signal at a plurality of relay nodes in communication with a source node;
filtering the pilot signal at each of the plurality of relay nodes to generate a filtered pilot signal;
process the filtered pilot signal at each of the plurality of relay nodes to generate an orthogonal pilot signal;
superimposing the orthogonal pilot signal onto the filtered pilot signal at each of the plurality of relay nodes to generate a superimposed filtered pilot signal;
transmitting the superimposed filtered pilot signals from the plurality of relay nodes to the destination node,
wherein the destination node receives the superimposed filtered pilot signals from the plurality of wireless relay nodes, and
estimates disintegrated channel information using the superimposed filtered pilot signals;
processing the data signal at each of the plurality of relay nodes into a space-time coded data signal;
transmitting the space-time coded data signals from the plurality of relay nodes to the destination node; and
receiving the space-time coded data signals at the destination node and processing the space-time coded data signals using the disintegrated channel information.

9. The method of claim 8, further comprising operating the plurality of relay nodes in a filter-and-forward mode of operation.

10. The method of claim 9, further comprising communicating between the plurality of relay nodes and the source node and the destination node using time-division multiplexing (TDM).

11. The method of claim 9, further comprising communicating between the plurality of relay nodes communicate and the source node and the destination node using frequency-division multiplexing (FDM).

12. The method of claim 9, further comprising communicating between the plurality of relay nodes communicate with the source node and the destination node using code-division multiplexing (CDM).

13. The method of claim 9, further comprising performing filtering at the plurality of relay nodes to reduce inter-relay-interference.

14. The method of claim 8, further comprising applying a training sequence at each relay node and multiplexing the training sequences.

* * * * *